US012766882B2

(12) United States Patent
Kinashi et al.

(10) Patent No.: US 12,766,882 B2
(45) Date of Patent: Oct. 20, 2026

(54) HUB ASSEMBLY FOR HUMAN POWERED VEHICLE

(71) Applicant: SHIMANO INC., Sakai City (JP)

(72) Inventors: Kosuke Kinashi, Sakai City (JP); Jun Nakajima, Sakai City (JP)

(73) Assignee: SHIMANO INC., Sakai (JP)

( * ) Notice: Subject to any disclaimer, the term of this patent is extended or adjusted under 35 U.S.C. 154(b) by 404 days.

(21) Appl. No.: 18/475,185

(22) Filed: Sep. 26, 2023

(65) Prior Publication Data

US 2025/0100327 A1 Mar. 27, 2025

(51) Int. Cl.

| | |
|---|---|
| ***B60B 27/04*** | (2006.01) |
| ***B60B 27/00*** | (2006.01) |
| ***B60B 27/02*** | (2006.01) |
| ***F16D 41/36*** | (2006.01) |

(52) U.S. Cl.
CPC ........ *B60B 27/047* (2013.01); *B60B 27/0073* (2013.01); *B60B 27/023* (2013.01); *F16D 41/36* (2013.01)

(58) Field of Classification Search
CPC . B60B 27/023; B60B 27/047; B60B 27/0073; B62J 13/04; B62M 9/10; F16D 41/24; F16D 41/36
See application file for complete search history.

(56) References Cited

U.S. PATENT DOCUMENTS

| | | | | |
|---|---|---|---|---|
| 2014/0060992 | A1* | 3/2014 | Spahr | B60B 27/023 192/64 |
| 2016/0223033 | A1* | 8/2016 | Fujita | F16D 41/36 |
| 2017/0096029 | A1 | 4/2017 | Fujita et al. | |
| 2017/0232791 | A1 | 8/2017 | Fujita et al. | |
| 2018/0345723 | A1* | 12/2018 | Fujita | B60B 27/023 |
| 2019/0047324 | A1* | 2/2019 | Fujita | B62M 9/10 |
| 2019/0092427 | A1* | 3/2019 | Oka | B60B 27/047 |
| 2019/0217662 | A1 | 7/2019 | Nakajima et al. | |
| 2020/0398611 | A1* | 12/2020 | Nakajima | B60B 27/0031 |

FOREIGN PATENT DOCUMENTS

| | | | |
|---|---|---|---|
| CN | 217598237 | U * | 10/2022 |
| CN | 217835245 | U * | 11/2022 |
| EP | 1547815 | A2 | 6/2005 |
| EP | 1881221 | A2 | 1/2008 |
| TW | 201524798 | | 7/2015 |
| TW | M534114 | U | 12/2016 |

* cited by examiner

*Primary Examiner* — Kip T Kotter
(74) *Attorney, Agent, or Firm* — MORI & WARD, LLP

(57) ABSTRACT

A hub assembly comprises a hub axle, a hub shell, a sprocket support body, a first ratchet member, a second ratchet member, and a spacer. The spacer includes at least one base member and at least one axial projection. The at least one axial projection extends from the at least one base member in an axial direction. The at least one axial projection is at least partially provided between at least one first tooth and at least one second tooth in a circumferential direction. A first axial tooth-end is closer to an axial center plane of the hub assembly than a second axial tooth-end. The at least one base member of the spacer is disposed at a location closer to the first axial tooth-end than the second axial tooth-end.

20 Claims, 21 Drawing Sheets

HUB ASSEMBLY FOR HUMAN POWERED VEHICLE

BACKGROUND

Technical Field

The present invention relates to a hub assembly of a human powered vehicle.

Background Information

A human powered vehicle includes a hub assembly. The hub assembly includes at least two members. One of objects of the present disclosure is to improve assembling or maintenance of the hub assembly. Another of objects of the present disclosure is to improve the motion of the hub assembly. Another of objects of the present disclosure is to restrict a foreign material from entering an inside of the hub assembly.

SUMMARY

In accordance with a first aspect of the present invention, a hub assembly for a human powered vehicle comprises a hub axle, a hub shell, a sprocket support body, a first ratchet member, a second ratchet member, and a spacer. The hub axle has a center axis defining an axial direction and a circumferential direction. The hub shell is rotatably mounted on the hub axle to rotate about the center axis. The hub shell includes at least one first tooth having a first axial tooth-end and a second axial tooth-end opposite to the first axial tooth-end. The sprocket support body is rotatably mounted on the hub axle to rotate about the center axis. The sprocket support body includes a first spline. The first ratchet member includes at least one first ratchet tooth and a second spline configured to engage with the first spline. The second ratchet member includes at least one second ratchet tooth and at least one second tooth. The at least one second ratchet tooth is configured to engage with the at least one first ratchet tooth. The at least one second tooth is configured to engage with the at least one first tooth. The spacer includes at least one base member and at least one axial projection. The at least one base member extends in the circumferential direction. The at least one axial projection extends from the at least one base member in the axial direction. The at least one axial projection is at least partially provided between the at least one first tooth and the at least one second tooth in the circumferential direction. The first axial tooth-end of the at least one first tooth is closer to an axial center plane of the hub assembly than the second axial tooth-end of the at least one first tooth. The at least one base member of the spacer is disposed at a location closer to the first axial tooth-end of the at least one first tooth than the second axial tooth-end of the at least one first tooth.

With the hub assembly according to the first aspect, since the at least one base member of the spacer is disposed at the location closer to the first axial tooth-end of the at least one first tooth than the second axial tooth-end of the at least one first tooth, the spacer is less likely to drop off during assembling or maintenance of the hub assembly. Thus, it is possible to improve assembling or maintenance of the hub assembly.

In accordance with a second aspect of the present invention, the hub assembly according to the first aspect further comprises a supporting member configured to push the spacer toward the second ratchet member in the axial direction.

With the hub assembly according to the first aspect, it is possible to hold the spacer between the supporting member and the second ratchet member in the axial direction. Thus, it is possible to reliably improve assembling or maintenance of the hub assembly.

In accordance with a third aspect of the present invention, the hub assembly according to the second aspect is configured so that the supporting member includes a radial projection configured to push the spacer toward the second ratchet member in the axial direction.

With the hub assembly according to the third aspect, it is possible to reliably hold the spacer between the radial projection and the second ratchet member in the axial direction. Thus, it is possible to reliably improve assembling or maintenance of the hub assembly.

In accordance with a fourth aspect of the present invention, the hub assembly according to the third aspect is configured so that the second ratchet member includes an engagement portion. The supporting member includes a first tubular portion extending from the radial projection toward the second ratchet member in the axial direction. The first tubular portion of the supporting member is configured to engage with the engagement portion of the second ratchet member.

With the hub assembly according to the fourth aspect, it is possible to reliably couple the supporting member and the second ratchet member using the engagement portion and the first tubular portion. Thus, it is possible to reliably improve assembling or maintenance of the hub assembly.

In accordance with a fifth aspect of the present invention, the hub assembly according to the fourth aspect is configured so that the first tubular portion of the supporting member is configured to engage with the engagement portion of the second ratchet member in a snap-fit manner.

With the hub assembly according to the fifth aspect, it is possible to reliably couple the supporting member and the second ratchet member using the engagement portion and the first tubular portion while enabling the supporting member to be detachably and reattachably coupled to the second ratchet member. Thus, it is possible to reliably improve assembling or maintenance of the hub assembly.

In accordance with a sixth aspect of the present invention, the hub assembly according to any one of the third to fifth aspects is configured so that the supporting member includes a second tubular portion extending from the radial projection toward the axial center plane of the hub assembly in the axial direction in an assembled state of the hub assembly.

With the hub assembly according to the sixth aspect, the second tubular portion can improve rigidity of the supporting member. Thus, it is possible to reliably improve assembling or maintenance of the hub assembly.

In accordance with a seventh aspect of the present invention, the hub assembly according to any one of the second to sixth aspects further comprises a spacer biasing member configured to bias the supporting member toward the second ratchet member in the axial direction.

With the hub assembly according to the seventh aspect, it is possible to reliably couple the supporting member and the second ratchet member using the engagement portion and the first tubular portion. Thus, it is possible to reliably improve assembling or maintenance of the hub assembly.

In accordance with an eighth aspect of the present invention, a hub assembly for a human powered vehicle comprises a hub axle, a hub shell, a sprocket support body, a first ratchet member, a second ratchet member, a biasing member, and a receiving member. The hub axle has a center axis defining an axial direction and a radial direction. The hub shell is rotatably mounted on the hub axle rotatably about the center axis. The hub shell includes at least one first tooth. The sprocket support body is rotatably mounted on the hub axle to rotate about the center axis. The sprocket support body includes a first spline. The first ratchet member includes at least one first ratchet tooth and a second spline configured to engage with the first spline. The second ratchet member includes at least one second ratchet tooth configured to engage with the at least one first ratchet tooth and at least one second tooth configured to engage with the at least one first tooth. The biasing member is provided between the hub shell and the first ratchet member in the axial direction to bias the first ratchet member toward the second ratchet member in the axial direction. The receiving member is provided between the first ratchet member and the biasing member in the axial direction. The first ratchet member has a radial ratchet-protrusion extending in the radial direction. The radial ratchet-protrusion of the first ratchet member is configured to restrict the receiving member from being displaced toward an axial center plane of the hub assembly in an assembled state of the hub assembly.

With the hub assembly according to the eighth aspect, the radial ratchet-protrusion of the first ratchet member makes the receiving member less likely to drop off from the first ratchet member. Thus, it is possible to stabilize the motion of the hub assembly.

In accordance with a ninth aspect of the present invention, the hub assembly according to the eighth aspect is configured so that the first ratchet member has an axial ratchet-protrusion extending in the axial direction.

With the hub assembly according to the ninth aspect, the axial ratchet-protrusion of the first ratchet member reliably makes the receiving member less likely to drop off from the first ratchet member. Thus, it is possible to reliably stabilize the motion of the hub assembly.

In accordance with a tenth aspect of the present invention, the hub assembly according to the ninth aspect is configured so that the axial ratchet-protrusion is configured to restrict the receiving member from being displaced apart from the first ratchet member in the radial direction.

With the hub assembly according to the tenth aspect, the axial ratchet-protrusion of the first ratchet member reliably makes the receiving member less likely to drop off from the first ratchet member. Thus, it is possible to reliably stabilize the motion of the hub assembly.

In accordance with an eleventh aspect of the present invention, the hub assembly according to any one of the eighth to tenth aspects is configured so that the receiving member includes a radial protrusion extending in the radial direction.

With the hub assembly according to the eleventh aspect, the radial protrusion makes the receiving member less likely to drop off from the first ratchet member. Thus, it is possible to reliably stabilize the motion of the hub assembly.

In accordance with a twelfth aspect of the present invention, the hub assembly according to the eleventh aspect is configured so that the radial protrusion of the receiving member is configured to engage with the radial ratchet-protrusion of the first ratchet member.

With the hub assembly according to the twelfth aspect, the radial protrusion and the radial ratchet-protrusion make the receiving member less likely to drop off from the first ratchet member. Thus, it is possible to reliably stabilize the motion of the hub assembly.

In accordance with a thirteenth aspect of the present invention, the hub assembly according to any one of the eighth to tenth aspects is configured so that the receiving member includes an axial protrusion extending in the axial direction.

With the hub assembly according to the thirteenth aspect, the axial protrusion can improve rigidity of the receiving member.

In accordance with a fourteenth aspect of the present invention, the hub assembly according to the thirteenth aspect is configured so that the axial protrusion of the receiving member is configured to abut against the first ratchet member.

With the hub assembly according to the fourteenth aspect, it is possible to stabilize an axial position of the receiving member relative to the first ratchet member in the axial direction. Thus, it is possible to reliably stabilize the motion of the hub assembly.

In accordance with a fifteenth aspect of the present invention, the hub assembly according to any one of the eighth to fourteenth aspects is configured so that the receiving member includes a first concave portion dented in the radial direction such that the first concave portion engages with the radial ratchet-protrusion.

With the hub assembly according to the fifteenth aspect, the first concave portion can reliably stabilize a position of the receiving member relative to the first ratchet member in the axial direction. Thus, it is possible to reliably stabilize the motion of the hub assembly.

In accordance with a sixteenth aspect of the present invention, the hub assembly according to the fifteenth aspect is configured so that the receiving member has an axially inner end portion extending from the first concave toward the axial center plane of the hub assembly in the axial direction. The axially inner end portion has a radially innermost surface positioned radially inwardly from the radial ratchet-protrusion in the radial direction.

With the hub assembly according to the sixteenth aspect, it is possible to reliably stabilize a position of the receiving member relative to the first ratchet member in the axial direction. Thus, it is possible to reliably stabilize the motion of the hub assembly.

In accordance with a seventeenth aspect of the present invention, a hub assembly for a human powered vehicle comprises a hub axle, a hub shell, a sprocket support body, and a seal member. The hub axle has a center axis defining an axial direction. The hub shell is rotatably mounted on the hub axle to rotate about the center axis. The hub shell includes at least one first tooth. The sprocket support body is rotatably mounted on the hub axle to rotate about the center axis. The seal member includes a fixed portion, a sealing portion, and a branching portion. The fixed portion is configured to be mounted to one of the hub shell and the sprocket support body. The sealing portion extends in a first direction so as to slide relative to the sprocket support body. The branching portion extends in a second direction different from the first direction so that a grease keeping space is formed between the sealing portion and the branching portion.

With the hub assembly according to the seventeenth aspect, it is possible to reliably maintain grease in the grease keeping space. Thus, the seal member can reliably restrict a foreign material from entering an inside of the hub assembly.

In accordance with an eighteenth aspect of the present invention, the hub assembly according to the seventeenth aspect further comprises a dust cover configured to be mounted to the sprocket support body.

With the hub assembly according to the eighteenth aspect, the seal member and the dust cover can more reliably restrict a foreign material from entering the inside of the hub assembly.

In accordance with a nineteenth aspect of the present invention, the hub assembly according to the eighteenth aspect is configured so that a labyrinth seal is formed between the seal member and the dust cover.

With the hub assembly according to the nineteenth aspect, the seal member and the dust cover can more reliably restrict a foreign material from entering the inside of the hub assembly.

In accordance with a twentieth aspect of the present invention, the hub assembly according to any one of the seventeenth to nineteenth aspects is configured so that the sprocket support body includes a first spline. The hub assembly further comprises a first ratchet member and a second ratchet member. The first ratchet member includes at least one first ratchet tooth and a second spline configured to engage with the first spline. The second ratchet member includes at least one second ratchet tooth configured to engage with the at least one first ratchet tooth and at least one second tooth configured to engage with the at least one first tooth. The biasing member is provided between the hub shell and the first ratchet member in the axial direction to bias the first ratchet member toward the second ratchet member in the axial direction.

With the hub assembly according to the twentieth aspect, it is possible to press the first ratchet member against the second ratchet member. Thus, it is possible to stabilize motion of the hub assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
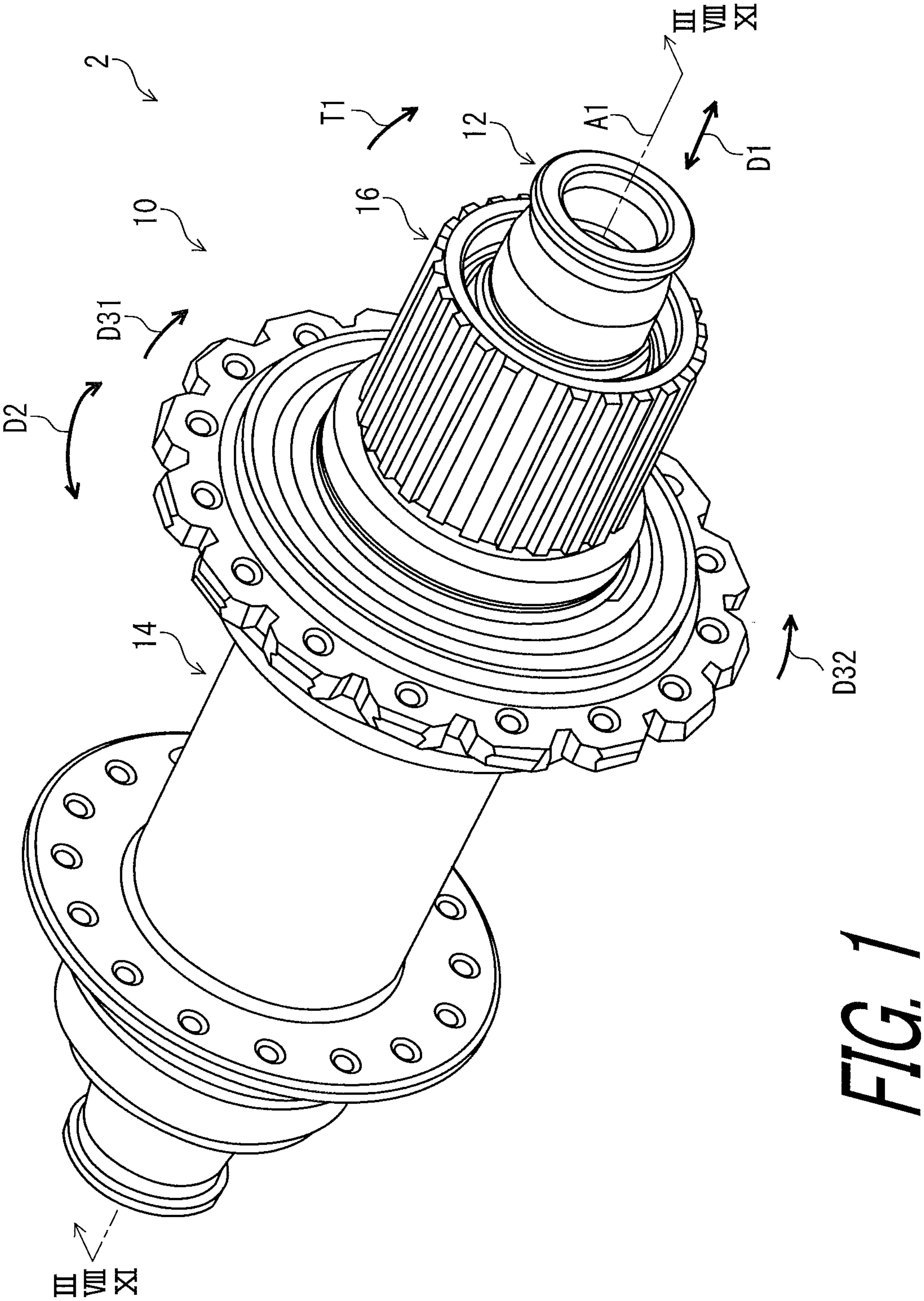
FIG. 1 is a perspective view of a human powered vehicle including a hub assembly in accordance with one of embodiments.

The embodiments will now be described with reference to the accompanying drawings, wherein like reference numerals designate corresponding or identical elements throughout the various drawings.

As seen in FIG. 1, a hub assembly 10 for a human powered vehicle 2 comprises a hub axle 12, a hub shell 14, and a sprocket support body 16. The hub axle 12 has a center axis A1. The hub axle 12 extends along the center axis A1. The center axis A1 defines an axial direction D1. The center axis A1 defines a circumferential direction D2. The axial direction D1 is defined along the center axis A1. The circumferential direction D2 is defined about the center axis A1. The hub shell 14 is rotatably mounted on the hub axle 12 to rotate about the center axis A1. The sprocket support body 16 is rotatably mounted on the hub axle 12 to rotate about the center axis A1. The hub shell 14 is configured to be coupled to at least two spokes of a wheel.

In the present application, the term "human powered vehicle" includes a vehicle to travel with a motive power including at least a human power of a user who rides the vehicle. The human powered vehicle includes a various kind of bicycles such as a mountain bike, a road bike, a city bike, a cargo bike, a hand bike, and a recumbent bike. Furthermore, the human powered vehicle includes an electric bike called as an E-bike. The electric bike includes an electrically assisted bicycle configured to assist propulsion of a vehicle with an electric motor. However, a total number of wheels of the human powered vehicle is not limited to two. For example, the human powered vehicle includes a vehicle having one wheel or three or more wheels. Especially, the human powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human powered vehicle 2 with facing a handlebar or steering. Examples of the user's standard position include a saddle and a seat. Accordingly, these terms, as utilized to describe the hub assembly 10 or other components, should be interpreted relative to the human powered vehicle 2 equipped with the hub assembly 10 or other components as used in an upright riding position on a horizontal surface.

Figure 2:
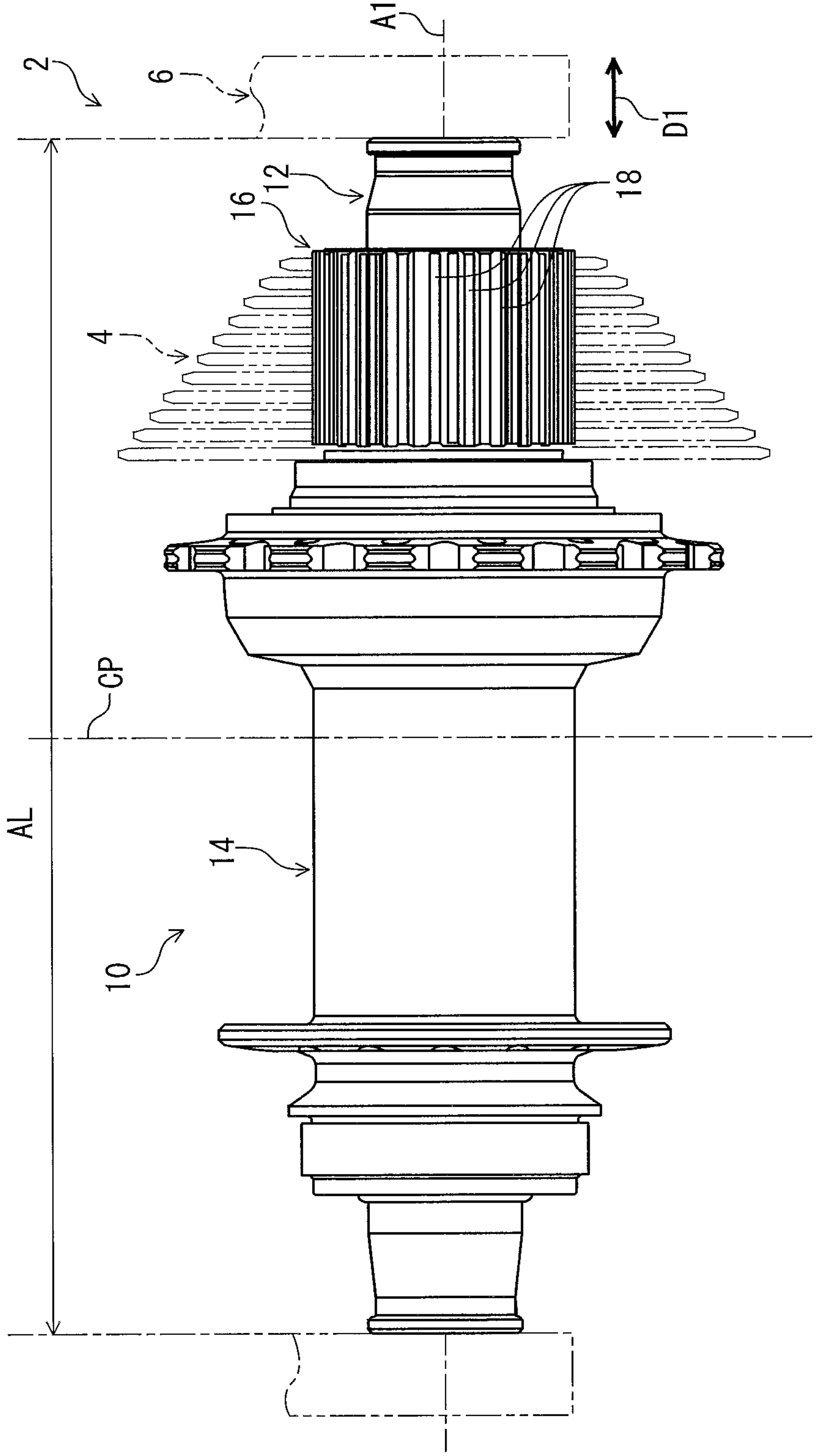
FIG. 2 is a side elevational view of the hub assembly illustrated in FIG. 1.

As seen in FIG. 2, the hub axle 12 is configured to be secured to a vehicle body 6 of the human powered vehicle 2 with a hub securing structure. The sprocket support body 16 is configured to be coupled to a sprocket assembly 4. The sprocket support body 16 is coupled to the sprocket assembly 4 to rotate integrally with the sprocket assembly 4 about the center axis A1. The sprocket support body 16 includes at least two external spline teeth 18. The at least two external spline teeth 18 are configured to engage with at least two internal spline teeth of the sprocket assembly 4.

An axial center plane CP is defined to bisect an axial length AL of the hub assembly 10 in the axial direction D1. The axial center plane CP is perpendicular to the center axis A1.

Figure 3:
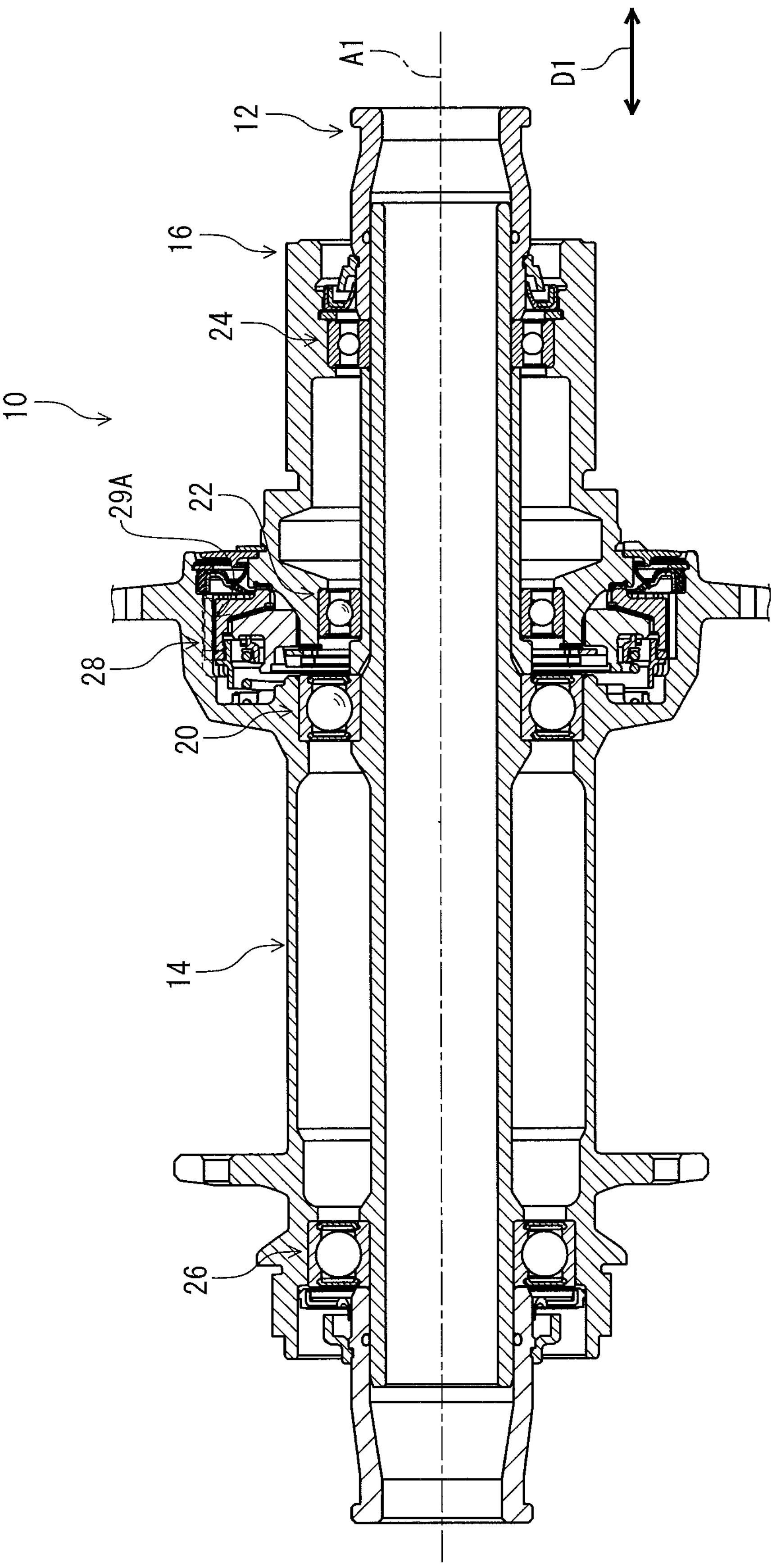
FIG. 3 is a cross-sectional view of the hub assembly taken along line III-III of FIG. 1.

As seen in FIG. 3, the hub assembly 10 includes a first bearing unit 20, a second bearing unit 22, a third bearing unit 24, and a fourth bearing unit 26. The first bearing unit 20 is provided between the hub axle 12 and the hub shell 14 to rotatably support the hub shell 14 relative to the hub axle 12 about the center axis A1. The second bearing unit 22 is provided between the hub axle 12 and the sprocket support body 16 to rotatably support the sprocket support body 16 relative to the hub axle 12 about the center axis A1. The third bearing unit 24 is provided between the hub axle 12 and the sprocket support body 16 to rotatably support the sprocket support body 16 relative to the hub axle 12 about the center axis A1. The fourth bearing unit 26 is provided between the hub axle 12 and the hub shell 14 to rotatably support the hub shell 14 relative to the hub axle 12 about the center axis A1.

The hub assembly 10 includes a one-way clutch structure 28. The one-way clutch structure 28 is configured to restrict the sprocket support body 16 from rotating relative to the hub shell 14 about the center axis A1 in a first rotational direction D31 (see e.g., FIG. 1). Thus, pedaling torque T1 is transmitted from the sprocket support body 16 to the hub shell 14 in the first rotational direction D31 (see e.g., FIG. 1) in a case where the sprocket support body 16 receives the pedaling torque T1 in the first rotational direction D31. The one-way clutch structure 28 is configured to allow the sprocket support body 16 to rotate relative to the hub shell 14 about the center axis A1 in a second rotational direction D32 (see e.g., FIG. 1). Namely, the one-way clutch structure 28 is configured to allow the hub shell 14 to rotate relative to the sprocket support body 16 about the center axis A1 in the first rotational direction D31 (see e.g., FIG. 1). As seen in FIG. 1, the first rotational direction D31 is an opposite direction of the second rotational direction D32.

Figure 4:
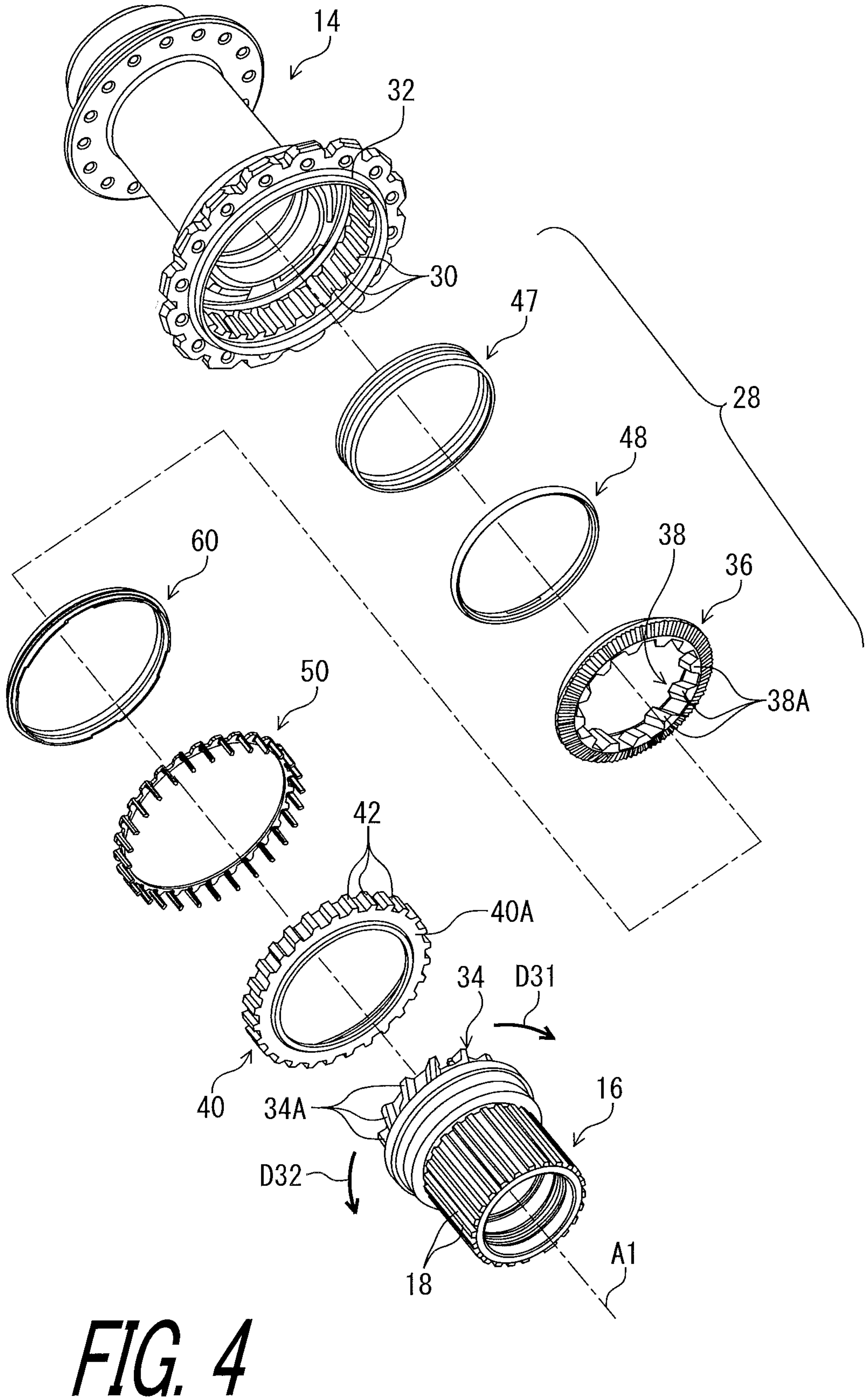
FIG. 4 is an exploded perspective view of a part of the hub assembly illustrated in FIG. 1.

As seen in FIG. 4, the hub shell 14 includes at least one first tooth 30. The hub shell 14 includes a tubular portion 32. In the present embodiment, the hub shell 14 includes at least two first teeth 30. However, the total number of the at least one first tooth 30 is not limited to the illustrated embodiment.

The sprocket support body 16 includes a first spline 34. The first spline 34 includes at least one first spline tooth 34A. In the present embodiment, the first spline 34 includes at least two first spline teeth 34A. However, the total number of the at least one first spline tooth 34A is not limited to the illustrated embodiment.

Figure 5:
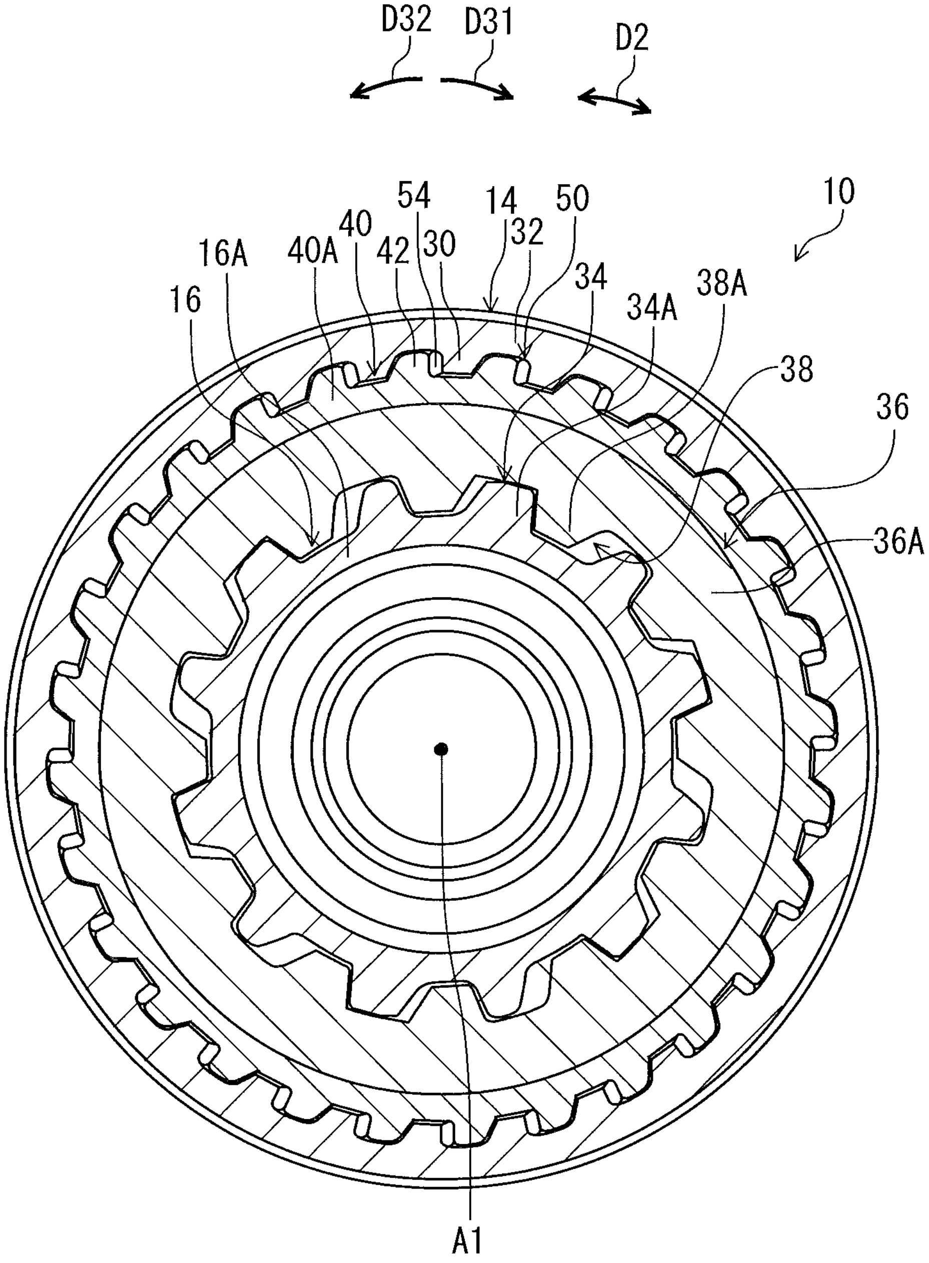
FIG. 5 is a cross-sectional view of the hub assembly taken along line V-V of FIG. 8.

As seen in FIG. 5, the at least one first tooth 30 extends radially inwardly from the tubular portion 32. The at least two first teeth 30 extend radially inwardly from the tubular portion 32. The sprocket support body 16 includes a base portion 16A. For example, the base portion 16A has an annular shape. The first spline 34 is provided radially outwardly of the base portion 16A. The at least one first spline tooth 34A extends radially outwardly of the base portion 16A. The at least two first spline teeth 34A extend radially outwardly of the base portion 16A. The shape of the base portion 16A is not limited to the annular shape.

As seen in FIG. 4, the one-way clutch structure 28 includes a first ratchet member 36. Namely, the hub assembly 10 for the human powered vehicle 2 comprises the first ratchet member 36. The first ratchet member 36 includes a second spline 38. The second spline 38 is configured to engage with the first spline 34. The second spline 38 includes at least one second spline tooth 38A. In the present embodiment, the second spline 38 includes at least two second spline teeth 38A. However, the total number of the at least one second spline tooth 38A is not limited to the illustrated embodiment.

As seen in FIG. 5, the first spline 34 and the second spline 38 are engaged to transmit a rotational force between the sprocket support body 16 and the first ratchet member 36. The at least one first spline tooth 34A and the at least one second spline tooth 38A mesh to transmit the rotational force between the sprocket support body 16 and the first ratchet member 36. The at least two first spline teeth 34A and the at least two second spline teeth 38A mesh to transmit the rotational force between the sprocket support body 16 and the first ratchet member 36.

The first ratchet member 36 includes a first base portion 36A. For example, the first base portion 36A has an annular shape. The second spline 38 is provided radially inwardly of the first base portion 36A. The at least one second spline tooth 38A extends radially inwardly of the first base portion 36A. The at least two second spline teeth 38A extend radially inwardly of the first base portion 36A. The shape of the first base portion 36A is not limited to the illustrated embodiment.

As seen in FIG. 4, the one-way clutch structure 28 includes a second ratchet member 40. Namely, the hub assembly 10 for the human powered vehicle comprises the second ratchet member 40. The second ratchet member 40 includes at least one second tooth 42. In the present embodiment, the second ratchet member 40 includes at least two second teeth 42. However, the total number of the at least one second tooth 42 is not limited to the illustrated embodiment.

The second ratchet member 40 includes a second base portion 40A. For example, the second base portion 40A has an annular shape. The at least one second tooth 42 extends radially outwardly of the second base portion 40A. The at least two second teeth 42 extends radially outwardly of the second base portion 40A. The shape of the second base portion 40A is not limited to the illustrated embodiment.

As seen in FIG. 5, the at least one second tooth 42 is configured to engage with the at least one first tooth 30. The at least one first tooth 30 and the at least one second tooth 42 mesh to transmit a rotational force between the hub shell 14 and the second ratchet member 40. The at least two second teeth 42 are configured to engage with the at least two first teeth 30. The at least two first teeth 30 and the at least two second teeth 42 mesh to transmit the rotational force between the hub shell 14 and the second ratchet member 40.

Figure 6:
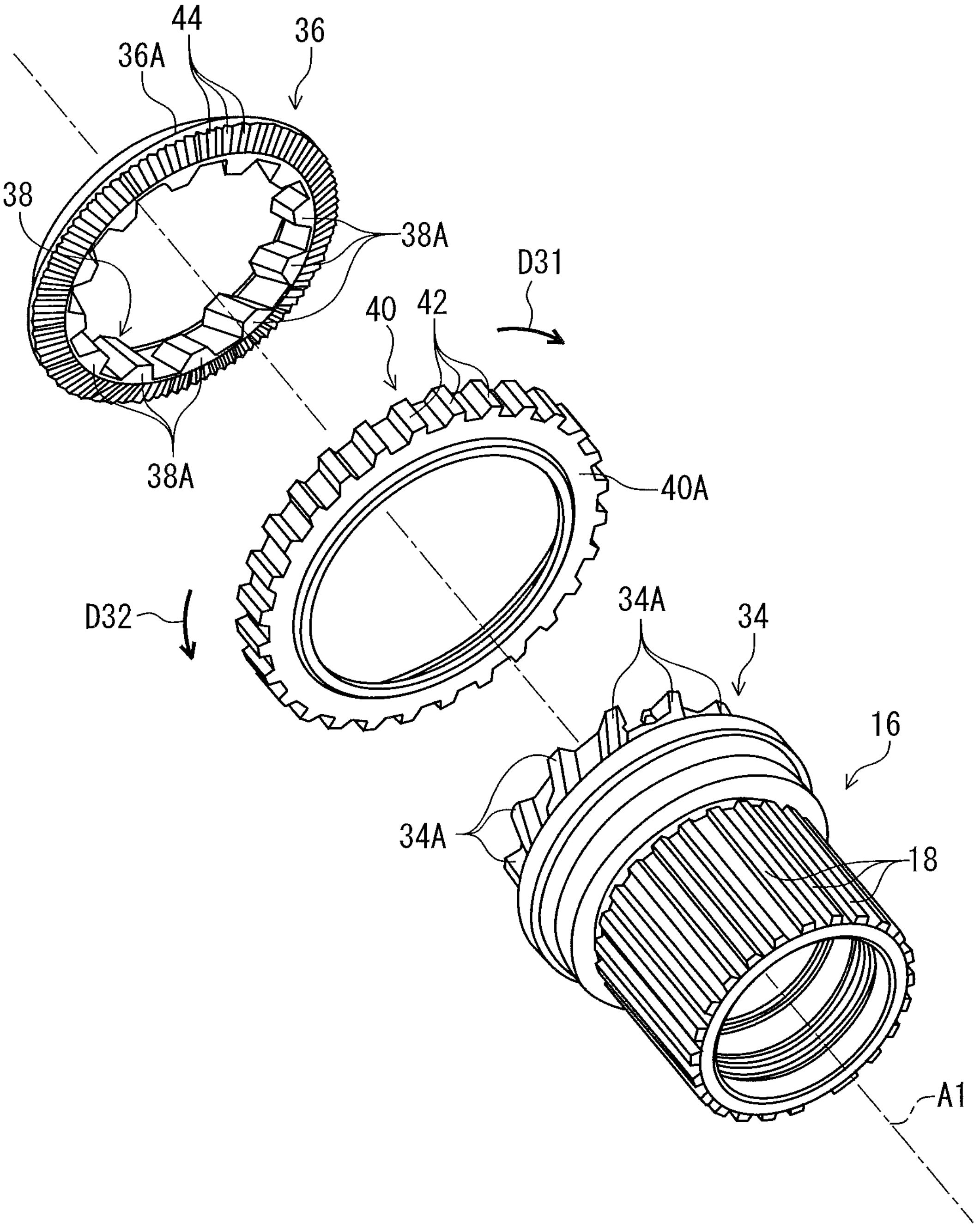
FIG. 6 is an exploded perspective view of a part of the hub assembly illustrated in FIG. 1.

As seen in FIG. 6, the first ratchet member 36 includes at least one first ratchet tooth 44. The at least one first ratchet tooth 44 protrudes from the first base portion 36A toward the second ratchet member 40. In the present embodiment, the first ratchet member 36 includes at least two first ratchet teeth 44. The at least two first ratchet teeth 44 protrude from the first base portion 36A toward the second ratchet member 40. However, the total number of the at least one first ratchet tooth 44 is not limited to the illustrated embodiment.

Figure 7:
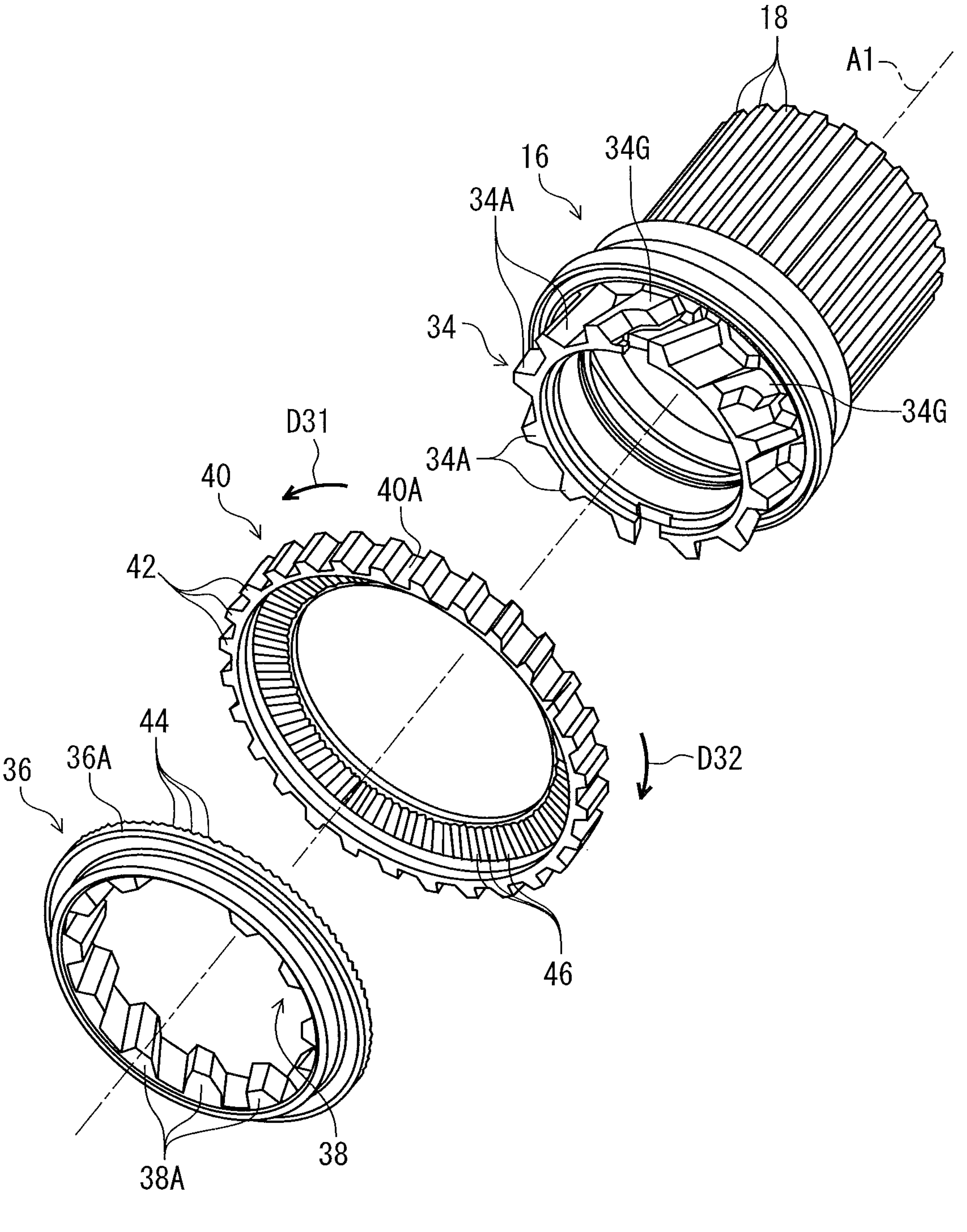
FIG. 7 is an exploded perspective view of a part of the hub assembly illustrated in FIG. 1.

As seen in FIG. 7, the second ratchet member 40 includes at least one second ratchet tooth 46. The at least one second ratchet tooth 46 protrudes from the second base portion 40A toward the first ratchet member 36. In the present embodiment, the second ratchet member 40 includes at least two second ratchet teeth 46. The at least two second ratchet teeth 46 protrude from the second base portion 40A toward the first ratchet member 36. However, the total number of the at least one second ratchet tooth 46 is not limited to the illustrated embodiment.

Figure 8:
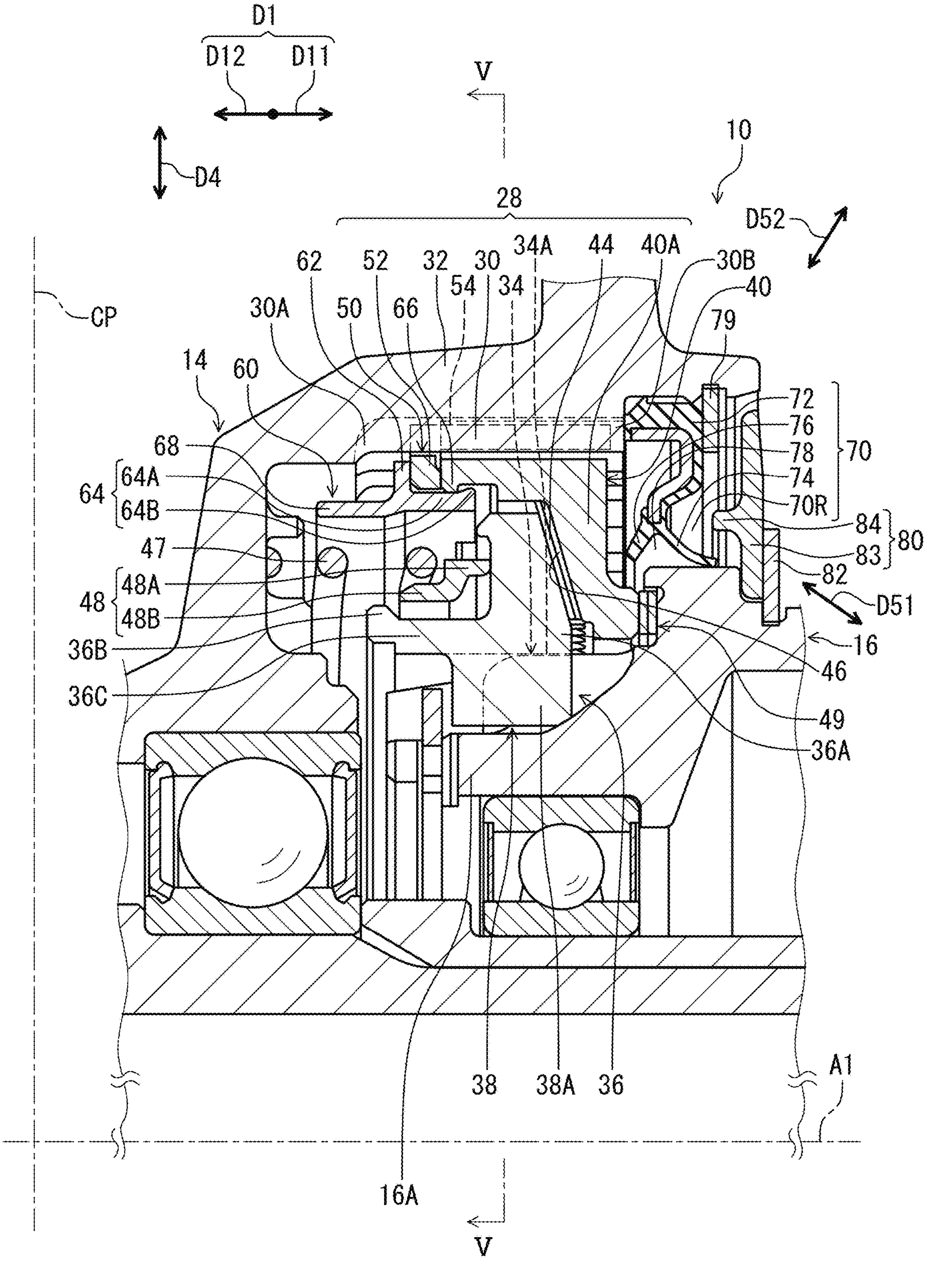
FIG. 8 is a cross-sectional view of the hub assembly taken along line VIII-VIII of FIG. 1.

As seen in FIG. 8, the at least one second ratchet tooth 46 is configured to engage with the at least one first ratchet tooth 44. The at least one first ratchet tooth 44 and the at least one second ratchet tooth 46 are configured to mesh to transmit a rotational force between the first ratchet member 36 and the second ratchet member 40. The at least two second ratchet teeth 46 are configured to engage with the at least two first ratchet teeth 44. The at least two first ratchet teeth 44 and the at least two second ratchet teeth 46 are configured to mesh to transmit the rotational force between the first ratchet member 36 and the second ratchet member 40.

The one-way clutch structure 28 includes a biasing member 47. Namely, the hub assembly 10 for the human powered vehicle 2 comprises the biasing member 47. The biasing member 47 is provided between the hub shell 14 and the first ratchet member 36 in the axial direction D1 to bias the first ratchet member 36 toward the second ratchet member 40 in the axial direction D1. The axial direction D1 includes the first axial direction D11 and a second axial direction D12. The second axial direction D12 is an opposite direction of the first axial direction D11. The biasing member 47 is configured to bias the first ratchet member 36 toward the second ratchet member 40 in the first axial direction D11. In the present embodiment, the biasing member 47 includes a spring. However, the biasing member 47 can include another member other than the spring if needed or desired.

The hub assembly 10 for the human powered vehicle 2 comprises a receiving member 48. The receiving member 48 is provided between the first ratchet member 36 and the biasing member 47 in the axial direction D1. The receiving member 48 is pressed against the first ratchet member 36 by the biasing member 47. The receiving member 48 is in slidable contact with the first ratchet member 36.

Figure 9:
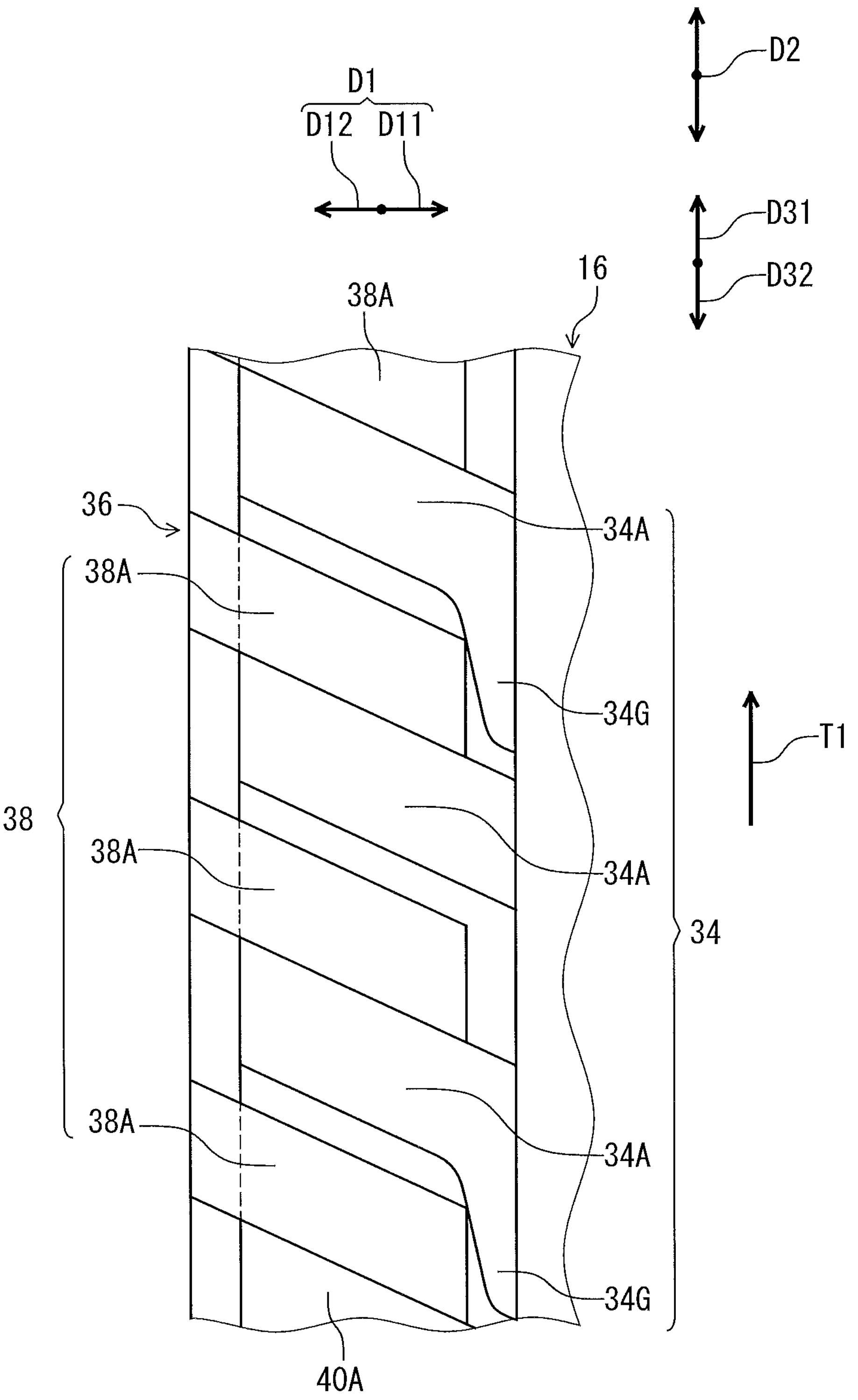
FIG. 9 is a schematic diagram showing an action of a first ratchet member and a sprocket support body of the hub assembly illustrated in FIG. 1 (pedaling).

As seen in FIG. 9, the first spline 34 includes a helical spline. The second spline 38 includes a helical spline. The first spline tooth 34A has a helical shape. The second spline tooth 38A has a helical shape. When the pedaling torque T1 is input to the sprocket support body 16 in the first rotational direction D31, the at least one second spline tooth 38A is guided by the at least one first spline tooth 36A relative to the sprocket support body 16 in a first axial direction D11. As seen in FIG. 8, this strongly brings the at least two first ratchet teeth 44 into engagement with the at least two second ratchet teeth 46. In this state, the pedaling torque T1 (see e.g., FIG. 9) is transmitted from the sprocket support body 16 to the hub shell 14 (FIG. 8) via the first ratchet member 36 and the second ratchet member 40 (FIG. 8).

Figure 10:
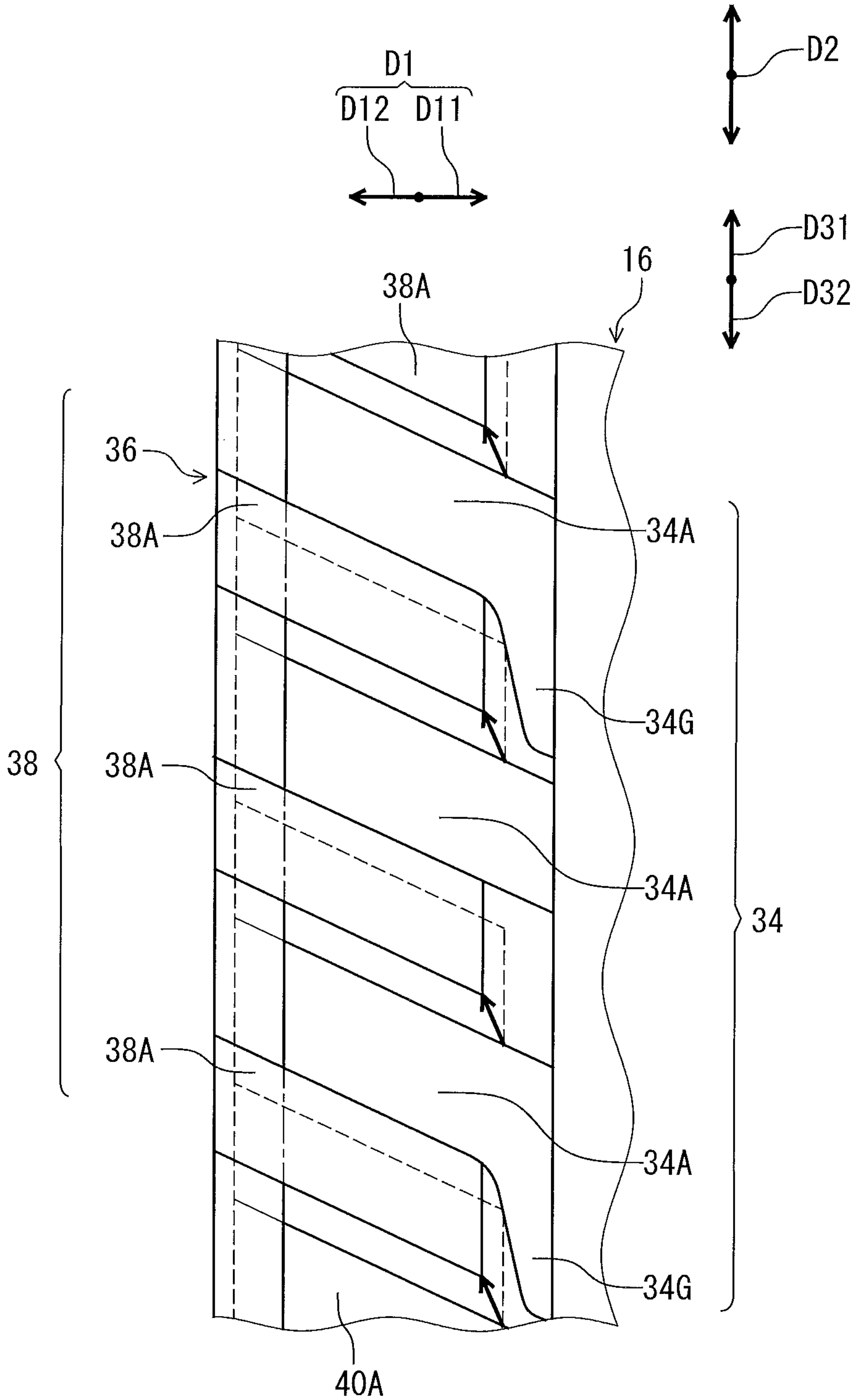
FIG. 10 is a schematic diagram showing an action of a first ratchet member and a sprocket support body of the hub assembly illustrated in FIG. 1 (coasting).

As seen in FIG. 10, the first spline 34 includes at least one guiding portion 34G. The guiding portion 34G extends from one of the at least one first spline tooth 34A in at least the circumferential direction D2. The at least one guiding portion 34G is configured to move the first ratchet member 36 away from the second ratchet member 40 in the second axial direction D12 during coasting or freewheeling. The at least one guiding portion 34G is configured to move the first ratchet member 36 against the biasing force of the biasing member 47 during coasting or freewheeling. As seen in FIG. 4, this allows the hub shell 14 and the second ratchet member 40 to rotate relative to the sprocket support body 16 and the first ratchet member 36 in the first rotational direction D31.

Rotation of the sprocket support body 16 and the sprocket assembly 4 are stopped during coasting since rotation of a crank is stopped while the human powered vehicle 2 travels forward. A wheel coupled to the hub shell 14 rotates in the first rotational direction D31 while the rotation of the sprocket support body 16 and the sprocket assembly 4 are stopped during coasting. When the hub shell 14 rotates relative to the sprocket support body 16 in the first rotational direction D31, the at least one guiding portion 34G and the at least one first spline tooth 34A guide the at least one second spline tooth 38A in the second axial direction D12. Thus, the first ratchet member 36 is moved relative to the second ratchet member 40 in the second axial direction D12 during coasting against the biasing force of the biasing member 47, reducing the engagement between the first ratchet teeth 44 and the second ratchet teeth 56. This allows the second ratchet member 40 to rotate relative to the first ratchet member 36 in the first rotational direction D31 while the at least one first ratchet tooth 44 of the first ratchet member 36 slides with the at least one second ratchet tooth 46 of the second ratchet member 40. Thus, the hub shell 14 is rotatable relative to the sprocket support body 16 in the first rotational direction D31 during coasting.

As seen in FIG. 7, in the present embodiment, the guiding portion 34G is integrally provided with the first spline tooth 34A as a one-piece unitary member. However, the guiding portion 34G can be a separate member from the first spline tooth 34A if needed or desired.

Figure 11:
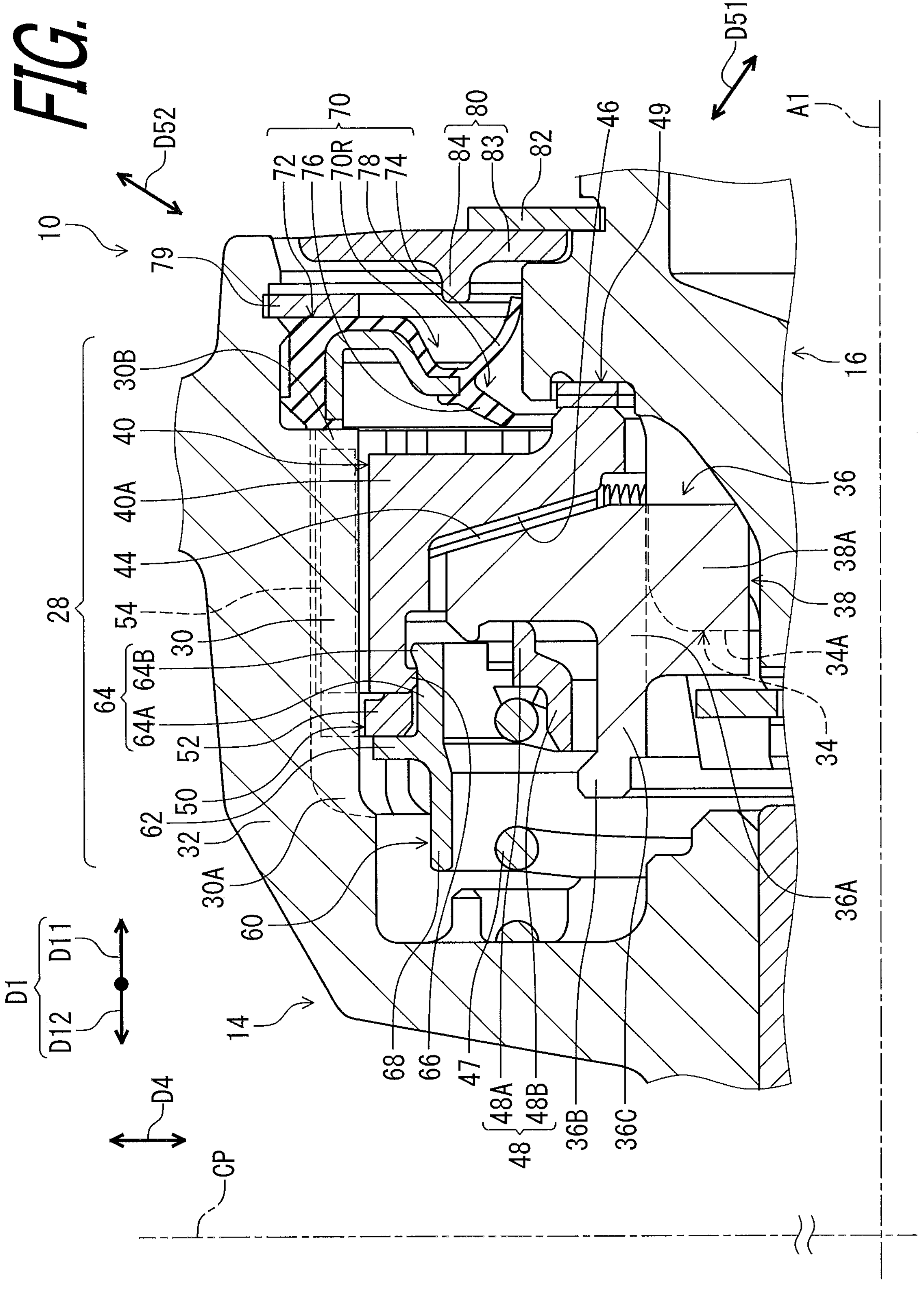
FIG. 11 is an enlarged cross-sectional view of the hub assembly taken along line XI-XI of FIG. 1.

As seen in FIG. 11, the first ratchet member 36 has a radial ratchet-protrusion 36B. The center axis A1 defines a radial direction D4. The radial ratchet-protrusion 36B extends in the radial direction D4. The first ratchet member 36 has an axial ratchet-protrusion 36C. The axial ratchet-protrusion 36C extends in the axial direction D1. The radial direction D4 is perpendicular to the center axis A1. The axial ratchet-protrusion 36C extends from the first base portion 36A toward the axial center plane CP in the axial direction D1. The radial ratchet-protrusion 36B extends radially outwardly from the axial ratchet-protrusion 36C in the radial direction D4.

The radial ratchet-protrusion 36B of the first ratchet member 36 is configured to restrict the receiving member 48 from being displaced toward the axial center plane CP of the hub assembly 10 in an assembled state of the hub assembly 10. The axial ratchet-protrusion 36C is configured to restrict the receiving member 48 from being displaced apart from the first ratchet member 36 in the radial direction D4. The radial ratchet-protrusion 36B can be omitted from the first ratchet member 36 if needed or desired. The axial ratchet-protrusion 36C can be omitted from the first ratchet member 36 if needed or desired.

The receiving member 48 includes an axial protrusion 48A. The axial protrusion 48A extends in the axial direction D1. The axial protrusion 48A of the receiving member 48 is configured to abut against the first ratchet member 36. The receiving member 48 includes an additional axial protrusion 48B. The additional axial protrusion 48B extends from the axial protrusion 48A away from the first ratchet member 36 in the axial direction D1. The additional axial protrusion 48B is at least partially provided radially inwardly of the axial protrusion 48A. The additional axial protrusion 48B is at least partially provided radially inwardly of the biasing member 47.

The hub assembly 10 includes a friction member 49. The friction member 49 is provided between the second ratchet member 40 and the sprocket support body 16. The friction member 49 is in slidable contact with the second ratchet member 40 and the sprocket support body 16. The biasing member 47 is configured to bias the receiving member 48, the first ratchet member 36, the second ratchet member 40, and the friction member 49 toward the sprocket support body 16 in the axial direction D1.

Figure 12:
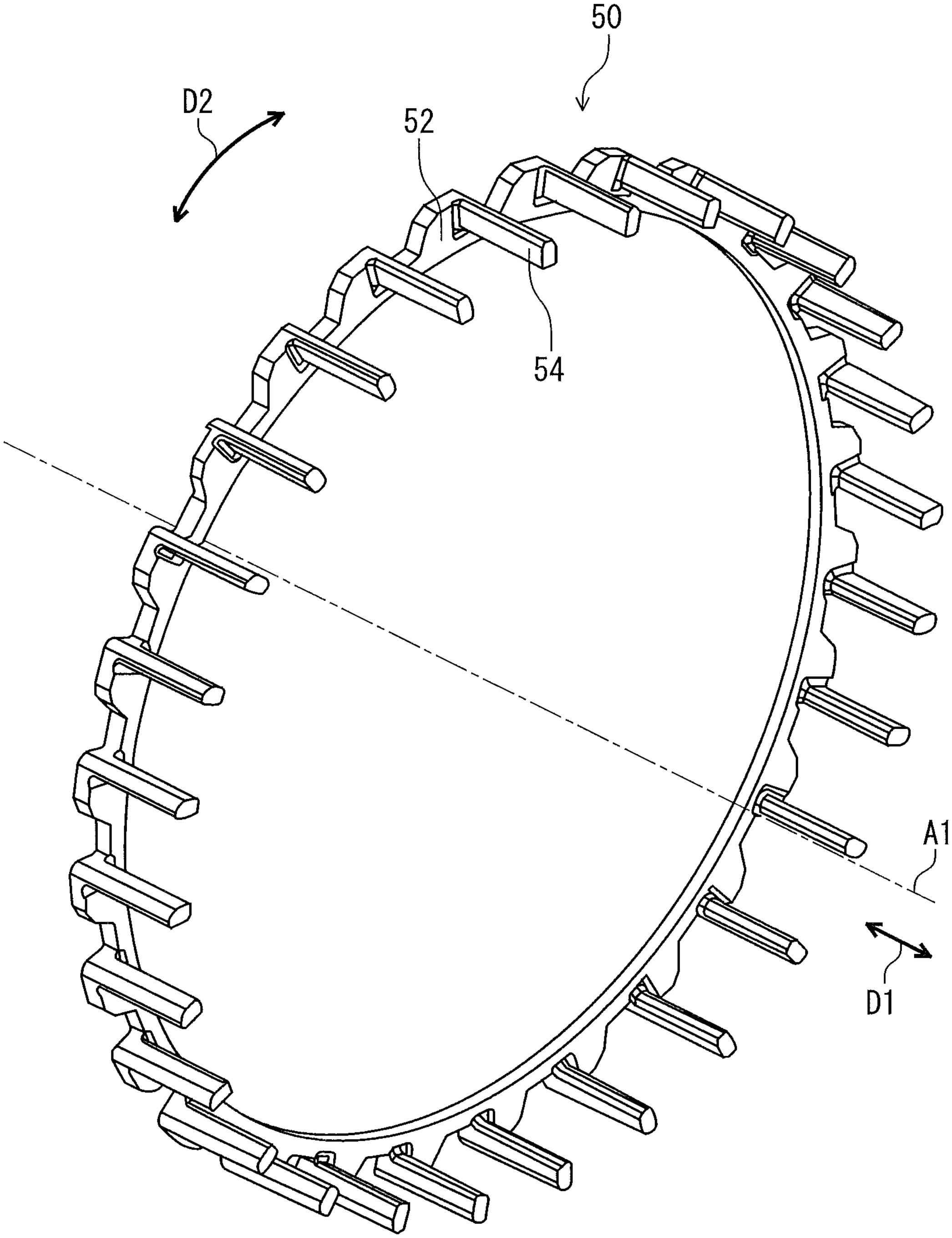
FIG. 12 is a perspective view of a spacer of the hub assembly illustrated in FIG. 1.

As seen in FIG. 12, the hub assembly 10 for the human powered vehicle comprises a spacer 50. The spacer 50 includes at least one base member 52 and at least one axial projection 54. The at least one base member 52 extends in the circumferential direction D2. The at least one axial projection 54 extends from the at least one base member 52 in the axial direction D1.

In the present embodiment, the spacer 50 includes a base member 52 and at least two axial projections 54. The base member 52 has an annular shape. The at least two axial projections 54 extend from the base member 52 in the axial direction D1. However, the total number of the at least one base member 52 is not limited to the illustrated embodiment. The total number of the at least one axial projection 54 is not limited to the illustrated embodiment. The spacer 50 can include at least two base members 52 arranged circumferential about the center axis A1 if needed or desired. In such modifications, for example, each of the at least two base members 52 has an arc shape.

As seen in FIG. 4, the at least one axial projection 54 is at least partially provided between the at least one first tooth 30 and the at least one second tooth 42 in the circumferential direction D2. The axial projection 54 is at least partially provided between the first tooth 30 and the second tooth 42 in the circumferential direction D2. The axial projection 54 is entirely provided between the first tooth 30 and the second tooth 42 in the circumferential direction D2. However, the axial projection 54 can be partially provided between the first tooth 30 and the second tooth 42 in the circumferential direction D2 if needed or desired.

In the present embodiment, the spacer 50 is made of a non-metallic material. The spacer 50 is made of a resin material. However, the spacer 50 can be made of a material other than resin material if needed or desired. The spacer 50 can be omitted from the hub assembly 10 if needed or desired.

As seen in FIG. 11, the at least one first tooth 30 has a first axial tooth-end 30A and a second axial tooth-end 30B opposite to the first axial tooth-end 30A. Each of the at least two first teeth 30 has the first axial tooth-end 30A and the second axial tooth-end 30B. The first tooth 30 extends between the first axial tooth-end 30A and the second axial tooth-end 30B in the axial direction D1. The first axial tooth-end 30A of the at least one first tooth 30 is closer to the axial center plane CP of the hub assembly 10 than the second axial tooth-end 30B of the at least one first tooth 30.

The at least one base member 52 of the spacer 50 is disposed at a location closer to the first axial tooth-end 30A of the at least one first tooth 30 than the second axial tooth-end 30B of the at least one first tooth 30. The at least one base member 52 of the spacer 50 can be disposed at a location closer to the second axial tooth-end 30B than the first axial tooth-end 30A if needed or desired.

The hub assembly 10 further comprises a supporting member 60. The supporting member 60 is configured to push the spacer 50 toward the second ratchet member 40 in the axial direction D1. The supporting member 60 is coupled to the second ratchet member 40 to restrict the spacer 50 from moving relative to the second ratchet member 40 in the axial direction D1.

The supporting member 60 includes a radial projection 62. The radial projection 62 is configured to push the spacer 50 toward the second ratchet member 40 in the axial direction D1. The radial projection 62 is contactable with the at least one base member 52 of the spacer 50. The at least one base member 52 of the spacer 50 is at least partially provided between the radial projection 62 and the second ratchet member 40 in the axial direction D1.

Figure 13:
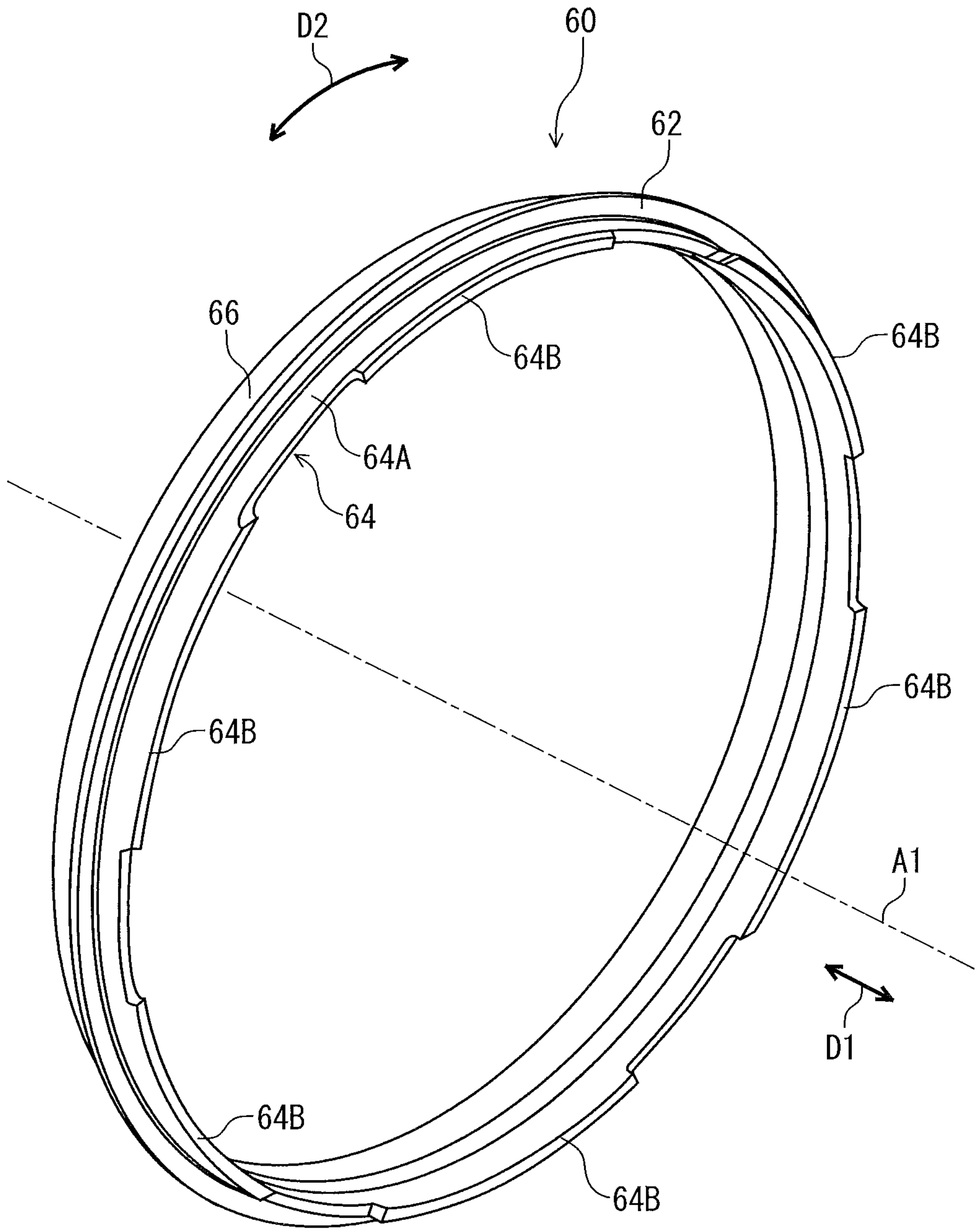
FIG. 13 is a perspective view of a supporting member of the hub assembly illustrated in FIG. 1.

As seen in FIG. 13, the supporting member 60 includes a first tubular portion 64. The radial projection 62 extends radially outwardly from the first tubular portion 64. For example, the radial projection 62 has an annular shape. The first tubular portion 64 has an annular shape. However, the shape of the radial projection 62 is not limited to the illustrated embodiment. The shape of the engagement portion 66 is not limited to the illustrated embodiment.

The first tubular portion 64 includes a tubular part 64A and at least one first engagement projection 64B. The at least one first engagement projection 64B protrudes from the tubular part 64A. In the present embodiment, the first tubular portion 64 includes at least two first engagement projections 64B. The at least two first engagement projections 64B protrude radially outwardly from the tubular part 64A. However, the total number of the at least one first engagement projection 64B is not limited to the illustrated embodiment.

As seen in FIG. 11, the first tubular portion 64 extends from the radial projection 62 toward the second ratchet member 40 in the axial direction D1. The second ratchet member 40 includes an engagement portion 66. The first tubular portion 64 of the supporting member 60 is configured to engage with the engagement portion 66 of the second ratchet member 40. The at least one base member 52 of the spacer 50 is at least partially provided between the radial projection 62 and the second ratchet member 40 in the axial direction D1 in a state where the first tubular portion 64 is engaged with the engagement portion 66. The first tubular portion 64 of the supporting member 60 is configured to detachably and reattachably engage with the engagement portion 66 of the second ratchet member 40.

In the present embodiment, the first tubular portion 64 of the supporting member 60 is configured to engage with the engagement portion 66 of the second ratchet member 40 in a snap-fit manner. However, the first tubular portion 64 of the supporting member 60 can be configured to engage with the engagement portion 66 of the second ratchet member 40 in a manner other than the snap-fit manner if needed or desired.

The engagement portion 66 protrudes radially inwardly from the second base portion 40A. The at least one first engagement projection 64B is configured to detachably and reattachably engage with the engagement portion 66. The at least two first engagement projections 64B are configured to engage with the engagement portion 66. The first tubular portion 64 is elastically deformable to allow the at least one first engagement projection 64B to be detached from or reattached to the engagement portion 66 of the second ratchet member 40.

The supporting member 60 includes a second tubular portion 68. The second tubular portion 68 extends from the radial projection 62 toward the axial center plane CP of the hub assembly 10 in the axial direction D1 in the assembled state of the hub assembly 10. In the present embodiment, the second tubular portion 68 has an annular shape. However, the second tubular portion 68 can have a shape other than the annular shape if needed or desired. The second tubular portion 68 can be omitted from the supporting member 60 if needed or desired.

As seen in FIG. 11, the hub assembly 10 for the human powered vehicle 2 comprises a seal member 70. The seal member 70 includes a fixed portion 72, a sealing portion 74, and a branching portion 76. The fixed portion 72 is configured to be mounted to one of the hub shell 14 and the sprocket support body 16. The sealing portion 74 extends in a first direction D51 so as to slide relative to the sprocket support body 16. The branching portion 76 extends in a second direction D52 different from the first direction D51 so that a grease keeping space 78 is formed between the sealing portion 74 and the branching portion 76. Grease is provided in the grease keeping space 78. The first direction D51 intersects the second direction D52. The first direction D51 intersects the axial direction D1. The second direction D52 intersects the axial direction D1.

The sealing portion 74 is configured to contact the sprocket support body 16 in the assembled state of the hub assembly 10. The sealing portion 74 is elastically deformed to maintain contact between the sealing portion 74 and the sprocket support body 16 in the assembled state. The branching portion 76 is spaced apart from the sprocket support body 16 in the assembled state.

The hub assembly 10 for the human powered vehicle 2 comprises a stopper 79. The stopper 79 is coupled to the hub shell 14 to hold the fixed portion 72 of the seal member 70 between the hub shell 14 and the stopper 79. The stopper 79 is detachably and reattachably coupled to the hub shell 14.

Figure 14:
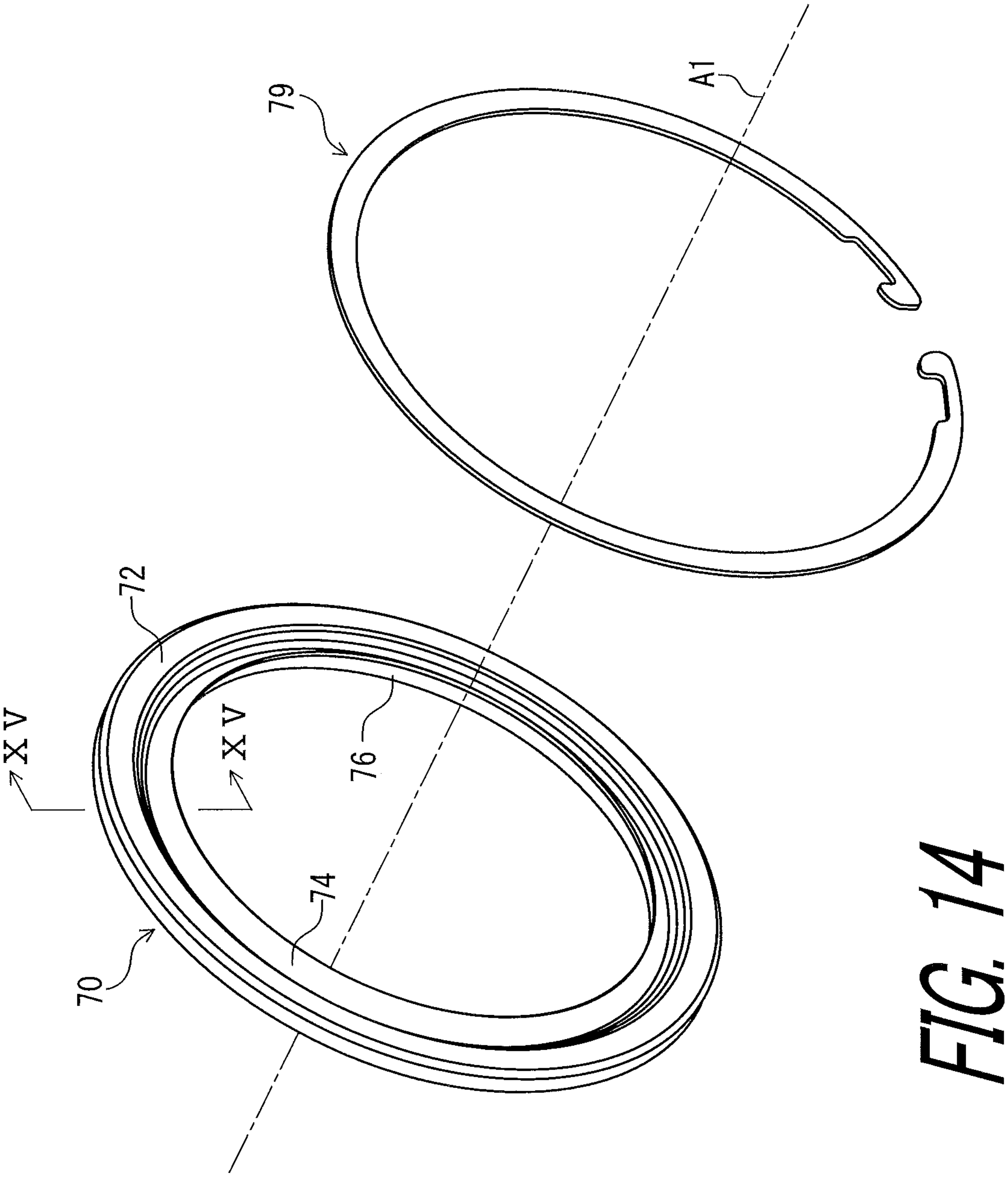
FIG. 14 is a perspective view of a seal member and a stopper of the hub assembly illustrated in FIG. 1.
Figure 15:
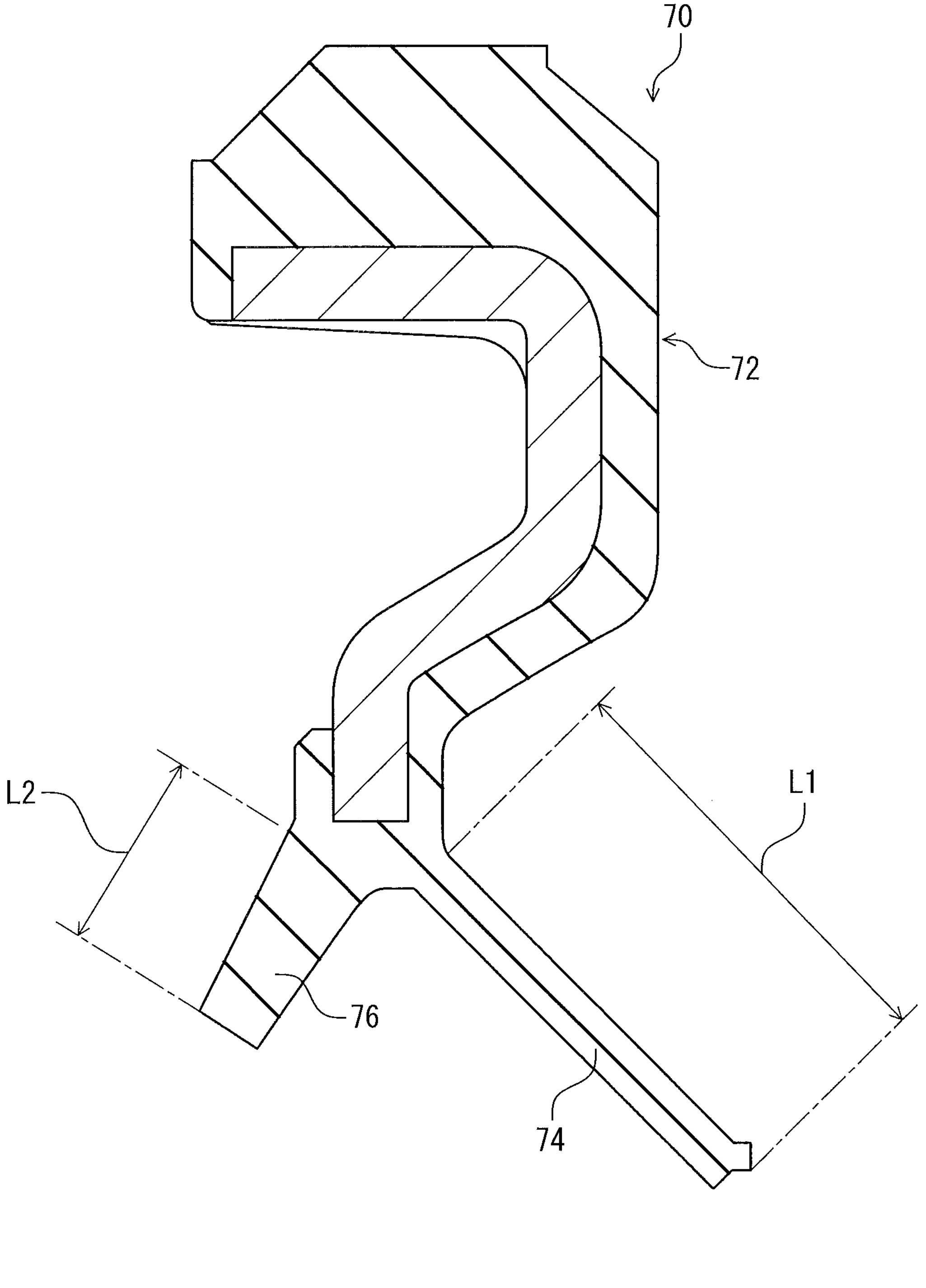
FIG. 15 is an enlarged cross-sectional view of the seal member taken along line XV-XV of FIG. 14.

As seen in FIG. 14, the seal member 70 has an annular shape. The fixed portion 72 has an annular shape. The sealing portion 74 has an annular shape. The branching portion 76 has an annular shape. The stopper 79 includes a snap ring. However, the fixed portion 72 can have a shape other than the annular shape if needed or desired. The sealing portion 74 can have a shape other than the annular shape if needed or desired. The branching portion 76 can have a shape other than the annular shape if needed or desired. The stopper 79 can include a structure other than the snap ring if needed or desired. As seen in FIG. 15, the sealing portion 74 has a first length L1 defined from the fixed portion 72 in the first direction D51 in a detached state where the sealing portion 74 is detached from the hub shell 14. The branching portion 76 has a second length L2 defined from the fixed portion 72 in the second direction D52 in the detached state where the sealing portion 74 is detached from the hub shell 14. In the present embodiment, the first length L1 is longer than the second length L2. However, the first length L1 can be equal to or shorter than the second length L2 if needed or desired.

As seen in FIG. 11, the hub assembly 10 further comprises a dust cover 80. The dust cover 80 is configured to be mounted to the sprocket support body 16. The hub assembly 10 further comprises a cover stopper 82. The cover stopper 82 is coupled to the sprocket support body 16 to hold the dust cover 80 between the sprocket support body 16 and the cover stopper 82. The cover stopper 82 is detachably and reattachably coupled to the sprocket support body 16.

Figure 16:
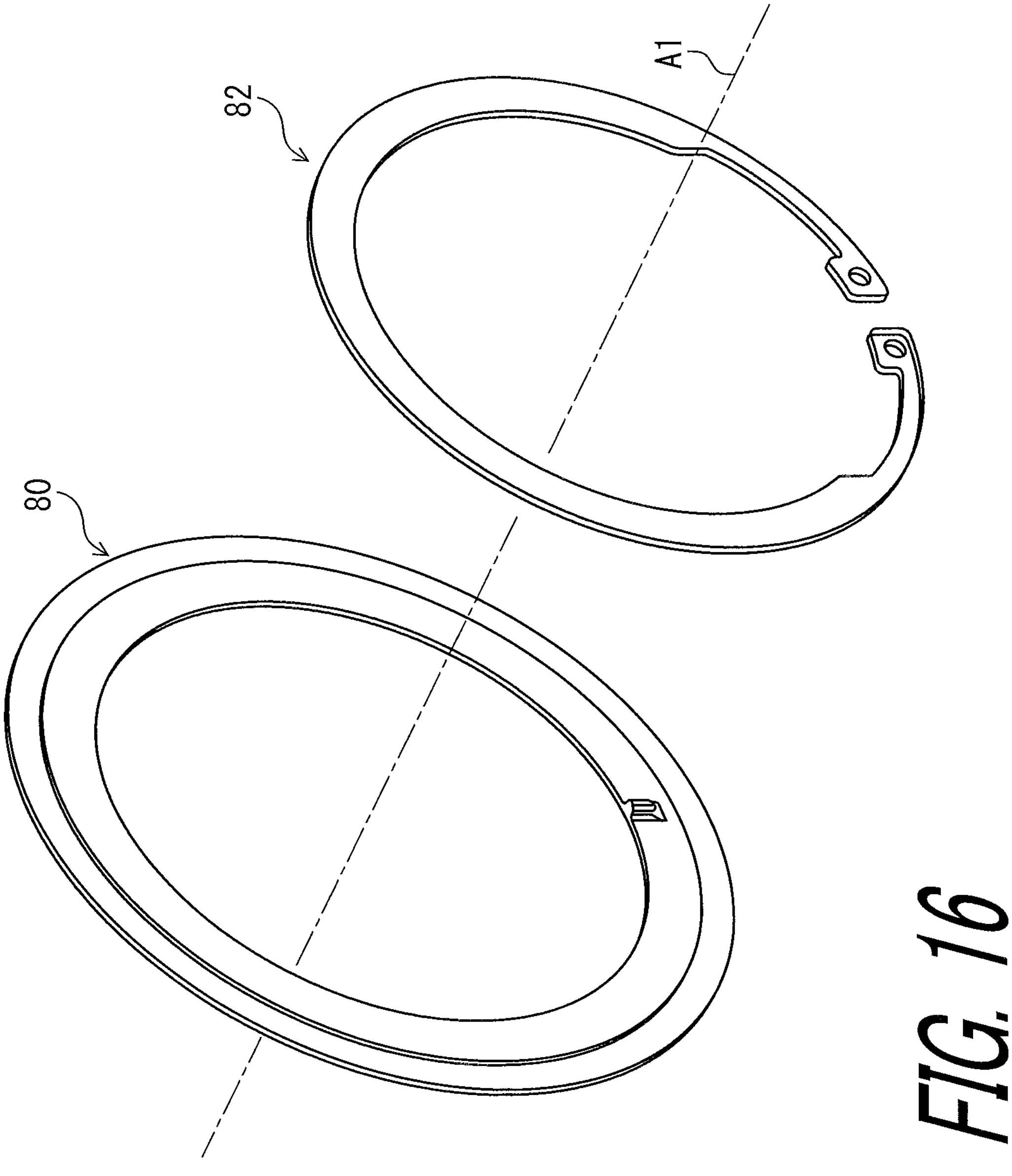
FIG. 16 is a perspective view of a dust cover and a cover stopper of the hub assembly illustrated in FIG. 1.

As seen in FIG. 16, the dust cover 80 has an annular shape. The cover stopper 82 includes a snap ring. However, the dust cover 80 can have a shape other than the annular shape if needed or desired. The cover stopper 82 can include a structure other than the snap ring if needed or desired.

As seen in FIG. 11, a labyrinth seal is formed between the seal member 70 and the dust cover 80. The dust cover 80 includes a dust cover base 83 and a protruding portion 84. The dust cover base 83 is configured to be mounted to the sprocket support body 16. The dust cover base 83 is radially spaced apart from the tubular portion 32 of the hub shell 14. The protruding portion 84 protrudes from the dust cover base 83 in the axial direction D1. The protruding portion 84 protrudes from the dust cover base 83 toward the seal member 70 in the axial direction D1.

The protruding portion 84 is at least partially provided radially inwardly of the fixed portion 72. The protruding portion 84 is at least partially provided radially outwardly of the sealing portion 74. The fixed portion 72 and the sealing portion 74 form a recess 70R. The recess 70R circumferentially extends about the center axis A1. The protruding portion 84 protrudes from the dust cover base 83 toward the recess 70R in the axial direction D1.

Figure 17:
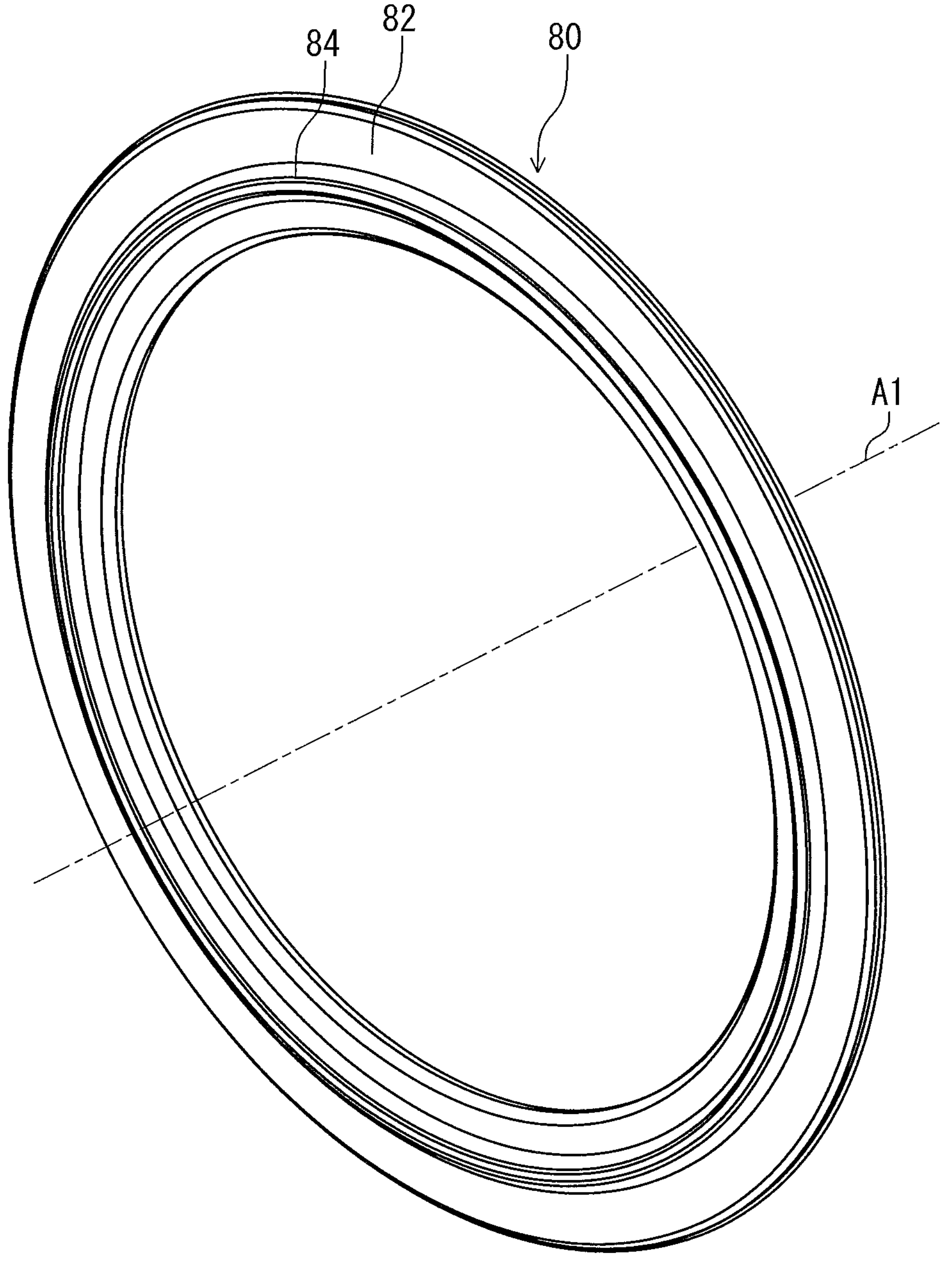
FIG. 17 is a perspective view of the dust cover of the hub assembly illustrated in FIG. 1.

As seen in FIG. 17, the dust cover base 83 has an annular shape. The protruding portion 84 has an annular shape. However, the dust cover base 83 can have a shape other than the annular shape if needed or desired. The protruding portion 84 can have a shape other than the annular shape if needed or desired.

Figure 18:
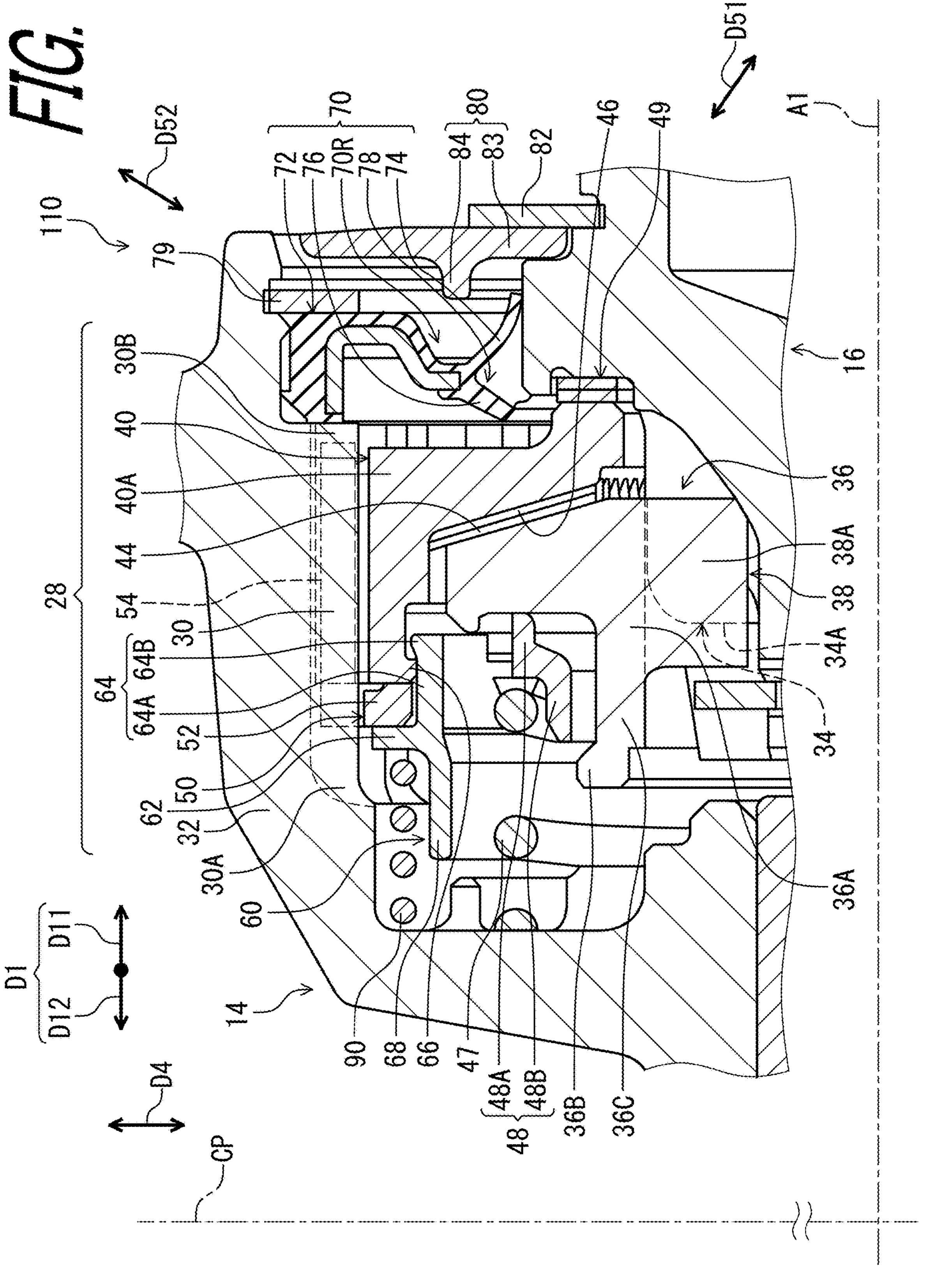
FIG. 18 is an enlarged cross-sectional view of the hub assembly in accordance with a modification.

As seen in FIG. 18, a hub assembly 110 in accordance with a first modification has substantially the same structure as the structure of the hub assembly 10 and can further comprise a spacer biasing member 90. The spacer biasing member 90 is configured to bias the supporting member 60 toward the second ratchet member 40 in the axial direction D1. In the first modification illustrated in FIG. 18, the second tubular portion 68 of the supporting member 60 makes the radial position of the spacer biasing member 90 more stable.

Figure 19:
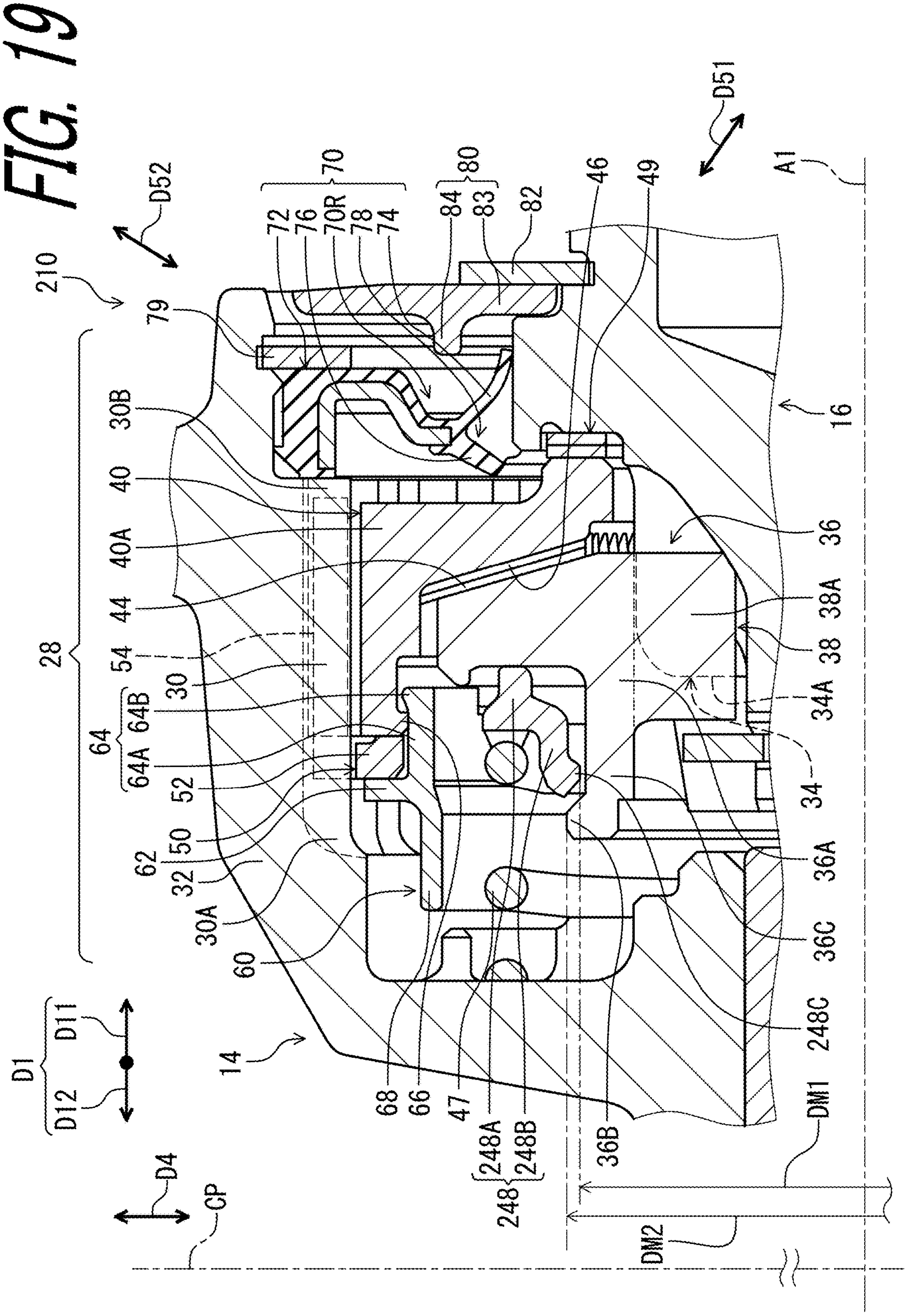
FIG. 19 is an enlarged cross-sectional view of the hub assembly in accordance with another modification.
Figure 20:
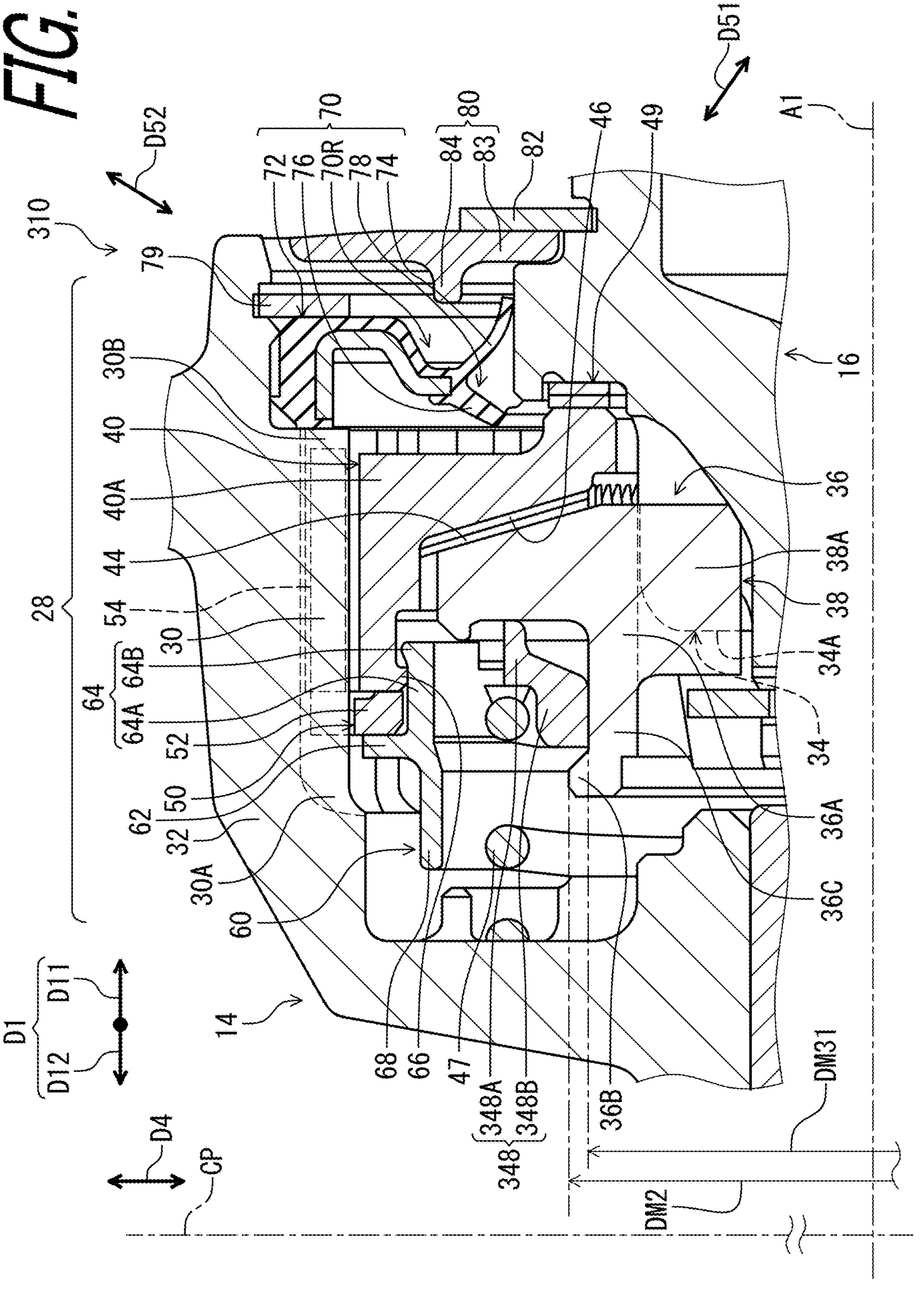
FIG. 20 is an enlarged cross-sectional view of the hub assembly in accordance with another modification.

As seen in FIG. 19, a hub assembly 210 in accordance with a second modification has substantially the same structure as the structure of the hub assembly 10 and can include a receiving member 248. The receiving member 248 has substantially the same structure as the structure of the receiving member 48 and can include an axial protrusion 248A, an additional axial protrusion 248B, and a radial protrusion 248C. The radial protrusion 248C extends in the radial direction D4. The radial protrusion 248C protrudes radially inwardly from the additional axial protrusion 248B of the receiving member 248. The radial protrusion 248C of the receiving member 248 is configured to engage with the radial ratchet-protrusion 36B of the first ratchet member 36. The receiving member 248 can have a minimum inner diameter DM1 which is less than an outer diameter DM2 of the radial ratchet-protrusion 36B. In the second modification depicted in FIG. 19, the minimum inner diameter DM1 is defined by the radial protrusion 248C. As seen in FIG. 20, however, the radial protrusion 248C can be omitted from the receiving member 248. As seen in FIG. 20, a hub assembly 310 in accordance with a third modification has substantially the same structure as the structure of the hub assembly 210 and can include a receiving member 348. The receiving member 348 has substantially the same structure as the structure of the receiving member 248 and can include an axial protrusion 348A and an additional axial protrusion 348B. A minimum inner diameter DM31 is defined by the additional axial protrusion 348B of the receiving member 348 and is less than the outer diameter DM2.

Figure 21:
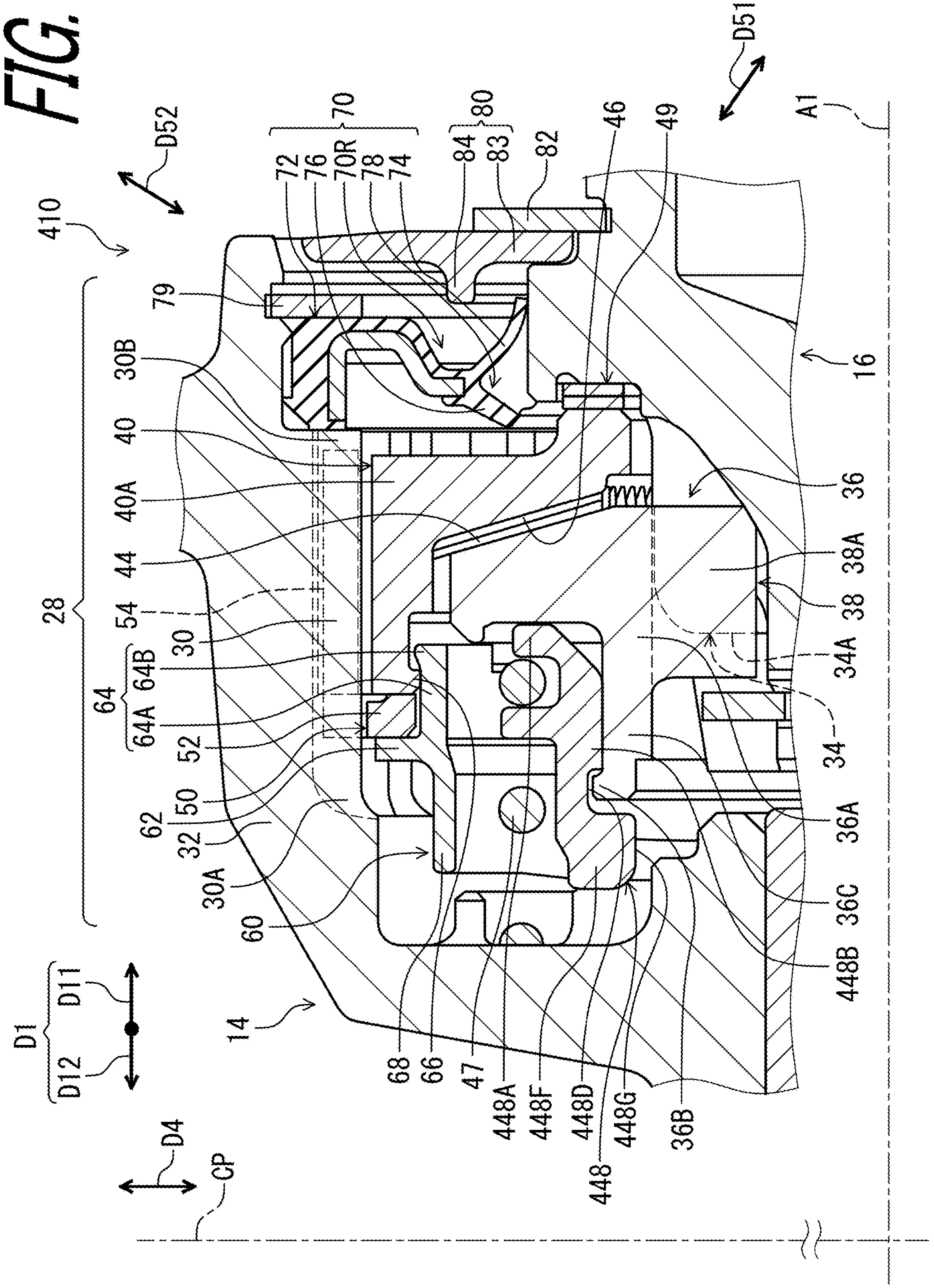
FIG. 21 is an enlarged cross-sectional view of the hub assembly in accordance with another modification.

As seen in FIG. 21, a hub assembly 410 in accordance with a fourth modification has substantially the same structure as the structure of the hub assembly 10 and can include a receiving member 448. The receiving member 448 can include an axial protrusion 448A, an additional axial protrusion 448B, and a first concave portion 448D. The first concave portion 448D is dented in the radial direction D4 such that the first concave portion 448D engages with the radial ratchet-protrusion 36B. The receiving member 448 has an axially inner end portion 448F. The axially inner end portion 448F extends from the first concave portion 448D toward the axial center plane CP of the hub assembly 10 in the axial direction D1. The axially inner end portion 448F has a radially innermost surface 448G. The radially innermost surface 448G is positioned radially inwardly from the radial ratchet-protrusion 36B in the radial direction D4.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure. Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A hub assembly for a human powered vehicle, the hub assembly comprising:

a hub axle having a center axis defining an axial direction and a circumferential direction;

a hub shell rotatably mounted on the hub axle to rotate about the center axis, the hub shell including at least one first tooth having a first axial tooth-end and a second axial tooth-end opposite to the first axial tooth-end;

a sprocket support body rotatably mounted on the hub axle to rotate about the center axis, the sprocket support body including a first spline;

a first ratchet member including:

at least one first ratchet tooth; and a second spline configured to engage with the first spline;

a second ratchet member including:

at least one second ratchet tooth configured to engage with the at least one first ratchet tooth; and at least one second tooth configured to engage with the at least one first tooth;

a spacer including:

at least one base member extending in the circumferential direction; and at least one axial projection extending from the at least one base member in the axial direction, the at least one axial projection being at least partially provided between the at least one first tooth and the at least one second tooth in the circumferential direction;

the first axial tooth-end of the at least one first tooth being closer to an axial center plane of the hub assembly than the second axial tooth-end of the at least one first tooth; and the at least one base member of the spacer being disposed at a location closer to the first axial tooth-end of the at least one first tooth than the second axial tooth-end of the at least one first tooth.

2. The hub assembly according to claim 1, further comprising a supporting member configured to push the spacer toward the second ratchet member in the axial direction.

3. The hub assembly according to claim 2, wherein:

the supporting member includes a radial projection configured to push the spacer toward the second ratchet member in the axial direction.

4. The hub assembly according to claim 3, wherein the second ratchet member includes an engagement portion, the supporting member includes a first tubular portion extending from the radial projection toward the second ratchet member in the axial direction, and the first tubular portion of the supporting member is configured to engage with the engagement portion of the second ratchet member.

5. The hub assembly according to claim 4, wherein the first tubular portion of the supporting member is configured to engage with the engagement portion of the second ratchet member in a snap-fit manner.

6. The hub assembly according to claim 3, wherein the supporting member includes a second tubular portion extending from the radial projection toward the axial center plane of the hub assembly in the axial direction in an assembled state of the hub assembly.

7. The hub assembly according to claim 2, further comprising a spacer biasing member configured to bias the supporting member toward the second ratchet member in the axial direction.

8. A hub assembly for a human powered vehicle, the hub assembly comprising:

a hub axle having a center axis defining an axial direction and a radial direction;

a hub shell rotatably mounted on the hub axle rotatably about the center axis, the hub shell including at least one first tooth;

a sprocket support body rotatably mounted on the hub axle to rotate about the center axis, the sprocket support body including a first spline;

a first ratchet member including:

at least one first ratchet tooth; and a second spline configured to engage with the first spline;

a second ratchet member including:

at least one second ratchet tooth configured to engage with the at least one first ratchet tooth; and at least one second tooth configured to engage with the at least one first tooth;

a biasing member provided between the hub shell and the first ratchet member in the axial direction to bias the first ratchet member toward the second ratchet member in the axial direction;

a receiving member provided between the first ratchet member and the biasing member in the axial direction;

the first ratchet member having a radial ratchet-protrusion extending in the radial direction; and the radial ratchet-protrusion of the first ratchet member being configured to restrict the receiving member from being displaced toward an axial center plane of the hub assembly in an assembled state of the hub assembly.

9. The bicycle hub assembly according to claim 8, wherein the first ratchet member has an axial ratchet-protrusion extending in the axial direction.

10. The hub assembly according to claim 9, wherein the axial ratchet-protrusion is configured to restrict the receiving member from being displaced apart from the first ratchet member in the radial direction.

11. The hub assembly according to claim 8, wherein the receiving member includes a radial protrusion extending in the radial direction.

12. The hub assembly according to claim 11, wherein the radial protrusion of the receiving member is configured to engage with the radial ratchet-protrusion of the first ratchet member.

13. The hub assembly according to claim 8, wherein the receiving member includes an axial protrusion extending in the axial direction.

14. The hub assembly according to claim 13, wherein the axial protrusion of the receiving member is configured to abut against the first ratchet member.

15. The hub assembly according to claim 8, wherein the receiving member includes a first concave portion dented in the radial direction such that the first concave portion engages with the radial ratchet-protrusion.

16. The hub assembly according to claim 15, wherein the receiving member has an axially inner end portion extending from the first concave toward the axial center plane of the hub assembly in the axial direction, and the axially inner end portion has a radially innermost surface positioned radially inwardly from the radial ratchet-protrusion in the radial direction.

17. A hub assembly for a human powered vehicle, the hub assembly comprising:

a hub axle having a center axis defining an axial direction;

a hub shell rotatably mounted on the hub axle to rotate about the center axis, the hub shell including at least one first tooth;

a sprocket support body rotatably mounted on the hub axle to rotate about the center axis; and a seal member including:

a fixed portion configured to be mounted to one of the hub shell and the sprocket support body;

a sealing portion extending in a first direction so as to slide relative to the sprocket support body; and a branching portion extending in a second direction different from the first direction so that a grease keeping space is formed between the sealing portion and the branching portion, the sealing portion having a first length defined from the fixed portion in the first direction in a detached state where the seal member is detached from the one of the hub shell and the sprocket support body, the branching portion having a second length defined from the fixed portion in the second direction in the detached state, the first length being longer than the second length, and the branching portion being closer to an axial center plane of the hub assembly than the sealing portion in the axial direction.

18. The hub assembly according to claim 17, further comprising a dust cover configured to be mounted to the sprocket support body.

19. The hub assembly according to claim 18, wherein a labyrinth seal is formed between the seal member and the dust cover.

20. The hub assembly according to claim 17, wherein the sprocket support body includes a first spline, and the hub assembly further comprises:

a first ratchet member including:

at least one first ratchet tooth; and a second spline configured to engage with the first spline;

a second ratchet member including:

at least one second ratchet tooth configured to engage with the at least one first ratchet tooth; and at least one second tooth configured to engage with the at least one first tooth; and a biasing member provided between the hub shell and the first ratchet member in the axial direction to bias the first ratchet member toward the second ratchet member in the axial direction.

* * * * *